United States Patent [19]
Litman

[11] Patent Number: 6,053,406
[45] Date of Patent: *Apr. 25, 2000

[54] ANTIFORGERY SECURITY SYSTEM

[75] Inventor: Mark A. Litman, Edina, Minn.

[73] Assignee: Aveka, Inc., Woodbury, Minn.

[ * ] Notice: This patent is subject to a terminal disclaimer.

[21] Appl. No.: 08/907,428

[22] Filed: Aug. 7, 1997

Related U.S. Application Data

[63] Continuation-in-part of application No. 08/692,753, Aug. 6, 1996, which is a continuation-in-part of application No. 08/651,157, May 17, 1996, Pat. No. 5,834,748.

[51] Int. Cl.[7] .................................................. G06K 7/03
[52] U.S. Cl. ........................ 235/449; 235/450; 235/493; 235/491
[58] Field of Search .................................. 235/449, 450, 235/493, 491

[56] References Cited

U.S. PATENT DOCUMENTS

| | | | |
|---|---|---|---|
| 3,409,129 | 11/1968 | Sperry | 209/111.8 |
| 3,878,367 | 4/1975 | Fayling et al. | 235/61.12 |
| 3,995,313 | 11/1976 | Fayling | 360/15 |
| 4,114,029 | 9/1978 | Lee | 235/449 |
| 4,114,032 | 9/1978 | Brosow et al. | 235/493 |
| 4,134,538 | 1/1979 | Lagarde et al. | 235/449 |
| 4,183,989 | 1/1980 | Tooth | 428/195 |
| 4,480,177 | 10/1984 | Allen | 235/379 |
| 4,500,116 | 2/1985 | Ferro et al. | 283/92 |
| 4,553,136 | 11/1985 | Anderson, III et al. | 340/572 |
| 4,752,676 | 6/1988 | Leonard et al. | 235/379 |
| 4,908,516 | 3/1990 | West | 250/556 |
| 5,019,696 | 5/1991 | Chang et al. | 235/436 |
| 5,204,526 | 4/1993 | Yamashita et al. | 235/493 |
| 5,220,166 | 6/1993 | Takeuchi et al. | 250/271 |
| 5,241,163 | 8/1993 | Vachtsevanos et al. | 235/449 |
| 5,266,789 | 11/1993 | Anglin et al. | 235/483 |
| 5,358,088 | 10/1994 | Barnes et al. | 194/206 |
| 5,362,952 | 11/1994 | Nair et al. | 235/449 |

(List continued on next page.)

FOREIGN PATENT DOCUMENTS

| | | | |
|---|---|---|---|
| 0363122 | 4/1990 | European Pat. Off. . | |
| 0428779 | 5/1991 | European Pat. Off. . | |
| 0490083A1 | 6/1991 | European Pat. Off. | G07F 7/08 |
| 0570924 | 11/1993 | European Pat. Off. . | |
| 3426006 | 11/1995 | Germany . | |
| 6-243304 | 9/1994 | Japan . | |
| 1127043 | 9/1968 | United Kingdom . | |
| WO92/16912 | 10/1992 | WIPO . | |
| WO95/07824 | 3/1995 | WIPO . | |

Primary Examiner—Donald Hajec
Assistant Examiner—Douglas X. Rodriguez
Attorney, Agent, or Firm—Schwegman, Lundberg, Woessner and Kluth

[57] ABSTRACT

Security may be enhanced for any magnetically readable system that may be applied or built into items, such as apparel, credit cards, currency, identification cards, or other transactional items. These and similar items, with informational content that can be varied may be used in systems for authenticating items and/or transactions. Such as system and method could include, for example, a method of verifying the authenticity of the source of information comprising:

a) providing a first signal from a source of information by moving an item along a path relative to a reading element, said relative movement along said path allowing a signal to be read that identifies the speed of relative movement of said item with respect to said reading element at a time during which information is being obtained from said item, b) transmitting said signal to a location where prior records or information attributed to previous signal from said item are stored, c) comparing said first signal to a defined signal(s) attributed to previous signals from said item, d) said comparing evaluating whether said first signal has a level of conformity to said defined signal(s) which exceeds a predetermined level of conformity, and e) providing a warning signal if the predetermined level of conformity is not achieved or is not exceeded.

32 Claims, 4 Drawing Sheets

U.S. PATENT DOCUMENTS

| | | | |
|---|---|---|---|
| 5,365,586 | 11/1994 | Indeck | 380/3 |
| 5,393,965 | 2/1995 | Bravman et al. | 235/383 |
| 5,428,683 | 6/1995 | Indeck et al. | 380/4 |
| 5,439,872 | 8/1995 | Ito et al. | 503/227 |
| 5,473,147 | 12/1995 | Hoshino et al. | 235/449 |
| 5,532,689 | 7/1996 | Beuno | 340/928 |
| 5,546,462 | 8/1996 | Indeck et al. | 380/23 |
| 5,554,842 | 9/1996 | Connell et al. | 235/491 |
| 5,601,931 | 2/1997 | Hoshino et al. | 428/537.5 |
| 5,602,381 | 2/1997 | Hoshino et al. | 235/493 |
| 5,602,527 | 2/1997 | Suenaga | 340/551 |
| 5,616,911 | 4/1997 | Jagielinski | 235/493 |
| 5,834,748 | 11/1998 | Litman | 235/450 |

ANTIFORGERY SECURITY SYSTEM

RELATED APPLICATIONS

This Application is a continuation-in-part of U.S. patent application Ser. No. 08/692,753, filed on Aug. 6, 1996, which is in turn a continuation-in-part of U.S. patent application Ser. No. 08/651,157, filed on May 17, 1996, now U.S. Pat. No. 5,834,748 in the name of Mark A. Litman and titled Antiforgery Security System.

BACKGROUND OF THE INVENTION

1. Field of the Invention

The present invention relates to 1) apparatus readable (mechanically readable) security means to prevent forgery of transactional items, merchandise and items of commerce, and including garments, apparel, mechanical devices (such as bolts, screws, rivets, and the like) and clothing, 2) the apparatus which is useful in reading security indicia on such items, 3) the process of applying, using and removing the indicia and 4) the process of reading or authenticating code implanted in such items. The invention also relates to a secondary device for enhancing security against shoplifting and means for removing indicia for the secondary apparatus and even the security means quickly and without damage to the primary article being protected. The invention also relates to the presence of a not necessarily security/identification encoding which is contemporaneous read (at approximately the same time) to enable reading of the security coding with high accuracy, even when the relative movement between the security coding and the reading apparatus is not regular (as when the card is moved manually along a strip reader).

2. Background of the Art

The present invention relates to 1) apparatus readable (mechanically readable) security means to prevent forgery of transactional items, and especially economic transactional items such as identification cards, drivers licenses, currency, credit cards (including the new smart cards with readable chips therein), money orders, checks, tickets and the like, 2) the apparatus which is useful in reading such transactional items, and 3) the process of reading or authenticating code implanted in transactional items. The invention also relates to a secondary device and means for qualifying or approving materials before they will be accepted into a primary device such as a compact disk player, imaging apparatus, CD-ROM drive, floppy, optical or floptical disk drive, and the like.

It is critical to the security of economic systems that the means of implementing economic transactions not be reproducible without providing independent value into that economic system. This is why actions such as forgery, in which false replications are made of economic transactional items such as checks, currency, credit cards and the like, are serious threats to the security interests of people, businesses and nations. There are severe criminal penalties attached to the commission of these crimes of forgery or counterfeiting because of the potential for widespread societal harm from counterfeiting. Unfortunately, technological advances aid the enactment of the crime of forgery as much as it improves the detection of false replications.

The conflict between forgery and detection is hardly new, tracing back further than Greek history, where the proposition of Archimedes' principle was based on an effort to enable detection of forgery. Archimedes was an advisor to the state, which had commissioned the molding of a solid gold crown for a religious ceremony. The authorities wished to assure that the crown was in fact pure gold, but they could not cut into the crown once it had been made as that would have been sacrilegious. While sitting in a bath tub, Archimedes noted the rise and fall of the water level as he lifted various parts of his body in and out of the tub. He predicted that the volume of water displaced was equal to either the volume submerged in the water or the weight of material which floated on the water. The story has it that he ran through the streets yelling "Eureka!" at the discovery, and upon submerging a block of gold equal to the weight of the crown, found that a different volume of water was displaced by the crown than the block of gold. The two items were of different densities and therefore the crown was not pure gold. The forgery was thus detected.

It is equally critical to the security of marketing systems and outlets that the authenticity of goods are assured and that the goods are not be reproducible without value to the originator of the item. This is why actions such as pirating and counterfeiting of mercantile items such as sweaters, shirts, pants, jackets, furniture, compact disks, cassettes and the like, are serious threats to the security interests of businesses. There are severe criminal penalties attached to the commission of crimes of forgery, pirating or counterfeiting, and there are additional costs attached to shoplifting which adversely affects the legitimate dealers, both of which crimes are presently estimated as costing the economies of the world billions of dollars. Unfortunately, it is difficult for store owners or legal authorities to readily identify knock-off or pirated items at the purchase source (wholesale) or sales source (retail).

It is difficult to detect forgeries today, even with the availability of modern technology. This is especially true where such detection has to be performed in the marketplace (in stores, airports, overseas, etc.) and there is no readily available means for accessing proving technology equivalent to the technology clandestinely used to create the forgery. This makes the forgery of market goods and especially apparel and the like relatively easy in today's worldwide economic system.

Magnetic media have already been used in various forms to attempt to prevent forgery of merchandise and transactional items. Large plastic clips which are adhesively secured or mechanically fastened to boxes or stapled onto fabric goods are commonplace in stores. U.S. Pat. No. 5,434,917 describes a method for encoding individual signals in plastic cards with randomly distributed ferrite particles.

U.S. Pat. No. 5,430,664 describes a method of verifying and counting items such as currency with both magnetic and optical reading of individual pieces of currency. U.S. Pat. No. 5,444,518 adds optical information to recorded images to prevent forgery.

U.S. Pat. No. 5,429,911 describes a method for depositing rows of magnetic materials onto a surface by etching grooves and depositing magnetic materials within the grooves.

U.S. Pat. No. 5,418,855 describes a visual method of testing items (including magnetic strips) by marking the item with inks or dyes that fluoresce when illuminated. Microprocessors analyze and compare signals with standards.

U.S. Pat. No. 5,444,370 describes the use of scanning devices on two ordered target tracks having magnetic sensitivity. Each output track provides different output signals.

U.S. Pat. No. 4,114,032 describes a means for reducing forgery in which materials, including fibers coated with magnetic particles, are embedded in a transactional item such as currency or credit cards. The magnetic fibers may be aligned vertically or perpendicularly to the plane of the material within the transactional item, at least when it is manufactured from paper, by having a magnetic field below the paper train. The magnetically filled item is authenticated merely by the presence of magnetic material which will respond to a magnetic plate or the like. A broad range of means for placing magnetic material onto the surface of the fibers is described. The presence of magnetic fibers and magnetic content can be determined by moving the item with respect to scanning means.

U.S. Pat. No. 3,878,367 describes a magnetic security document containing uniformly dispersed magnetic material onto which a magnetic pattern is imposed which can later be identified by scanning means. It is particularly desirable according to the invention to align the magnetizable particles at selected locations during the manufacturing process.

U.S. Pat. No. 3,995,313 describes a data accumulation system which comprises a homogeneous magnetic material which is capable of being magnetized throughout its surface in discrete patterns. The data may be subsequently sensed from recording media.

Modern marketplaces have various systems in place to reduce the ease of forgery, but these systems are far from effective when any significant technological effort is behind an attempt at forgery. These are minimal deterrents, as is evidenced by the volume of forgery still occurring, mainly because of the difficulty in identifying knock-off items quickly at the point of sale in stores. It would be desirable to enhance the security of merchandise in the marketplace against knock-off or pirated items.

It would also be desirable to include an antitheft potential to the authentication system of the present invention. It would therefore be desirable to develop a secondary device that could be used with any primary authentication apparatus with which an item is authenticated by the primary apparatus, the secondary device identifying unsold (unpaid for) goods and signaling to prevent them from leaving the store premises until paid for.

U.S. Pat. No. 4,183,989 describes a method for authenticating security papers by including both a magnetic signal and a second mechanically or visually readable signal into paper used for security papers such as checks, currency, tickets, credit cards and the like. The machine reading of the two implanted signals helps to authenticate the paper.

It has been proposed in certain literature that magnetic strips can provide both user identification and authentication of the origination of the item (e.g., credit card, etc.). The procedure attempts to have the magnetic reader obtain not only the usual identification information magnetically written onto the magnetic strip, but also reads the random distribution of magnetic particles between the magnetically written information. Because no additional materials, besides the magnetic strip have to be added, the unique random distribution of particles between the magnetically written information are believed to provide a unique fingerprint for each card. Each fingerprint, once read, is stored in a central information bank so that when the card is primarily identified, it is also authenticated by the fingerprint. This system suffers from the drawbacks that the background signal is extremely weak compared to the magnetically written signal, the back ground signal being weak will change easily (even by the influences of being read repeatedly) so that the fingerprint smears and becomes less reliable, and the amount of data produced in reading such a fingerprint is quite large and would take substantial drive space when multiplied by the potential millions of cards read and fingerprinted. This system is described in U.S. Pat. Nos. 5,365,586 and 5,428,683.

U.K. Patent No. 1,127,043 describes security papers having threads, planchettes or fibers with magnetic properties distributed therein which are detectable within the security papers. A magnetic thread may be unwound from a bobbin into a paper making mold or incorporated into a central layer of the paper in the course of manufacture. Alternatively fiber-like pieces may be mixed with the stock suspension so that the magnetic fibers are randomly distributed amongst the normal paper making fibers. The magnetic properties, including the coercivity, retentivity, permeability and hysteresis loss may be measured along with the frequency or directional dependence of the properties.

SUMMARY OF THE INVENTION

Elongated magnetic elements are provided which are inserted into economic transactional items or identification cards. These elongated magnetic elements may be fibers, filaments, long or intertwined fibers or threads, strips or the like. They may even be elongated crystals or elongated particles of magnetic material which are of greater length than the maximum dimensions typically desired in the provision of recordable magnetic particles in printed strips, but this is less preferred. Preferably they are fibers or filaments or very narrow strips, as these can provide the highest degree of security, as will be shown later. It is not necessary that the magnetic elements are recordable, in the conventional magnetic media sense (as in VHS tape, audio tape, floppy disks, and the like), and it is preferred that the filaments be magnetic without intent or capability of information recordation during operation of the security system.

The security of transactional items can be enhanced by the implementation of a mechanically readable security system which includes at least a mechanically readable magnetic marking embedded in the transactional item. The marking also may be visually notable or readable, but it at least must be readable by a reading head capable of reading the passage of a magnetic material by the head. The marking is preferably in the form of at least two magnetic filaments or strips and preferably includes a multiple number of filaments of differing coerciveness, magnetic field strength, magnetic field alignment, size and/or spacing so that when the transactional item is passed at a defined and preferably constant speed through the reading device, approval will be given by the apparatus only when the proper signal is provided by the ordered array of appropriate magnetic elements in the transactional item.

The security and authenticity of other items in the marketplace of a more mercantile nature can be enhanced by the implementation of a mechanically readable security system which includes at least a mechanically readable magnetic marking embedded in the item or especially in a label secured to the item. The marking also may be visually notable or readable, but it at least must be readable by a reading head capable of reading the passage of a magnetic material by the head. The marking is preferably in the form of at least two magnetic fibers, filaments or strips and preferably includes a multiple number of fibers, filaments of differing coerciveness, magnetic field strength, magnetic field alignment, size and/or spacing so that when the transactional item is passed at a defined and preferably constant speed through the reading device (which includes a reading device which moves a reading head over a stationary marking), approval will be given by the apparatus only when the proper signal is provided by the ordered array or uniquely distributed array of appropriate magnetic elements in the transactional item. Secondary markings for use with antishoplifting devices may also be combined with the authentication system. The antishoplifting markings should be readily removable at he point of sales without damage to the items and without the removal system being readily duplicated.

To avoid the need for increasing the tolerance or expanding the latitude of a signal which is acceptable to a screening of the item because of variations in the relative speed of movement between the item and the magnetic reading equipment, a line of readable material (readable by magnetic, optical, electronic, audio, or other mechanical means) can be read during the movement of the item. By reading the speed (especially the real time speed which can be related to the precise time of reading the magnetic security information) of the movement of the item, the variation in speed from a standard reading speed can be calculated at every moment during the reading of the item, the signals from the magnetic reading of the security coding can be normalized to a standard speed, the signals can be normalized to that standard speed, and a more precise signal can be evaluated for approval. This enhanced system would allow for manual movement of an item through a reading device (as is presently done with magnetic strip cards), without the need for lowering the tolerances for approval in a security/antiforgery system.

A system is also described for use with telephone charges on credit cards or network (via computer) charges using credit cards. In this system, a scanning device is attached to the computer or telephone to generate a signal authenticating the credit card during the charging procedure or transaction. This system adds additional security to the charging procedure and can eliminate fraud where credit card numbers are verbally transmitted over the telephone by requiring the use of the card in an inexpensive reading machine during the charge procedure. Even if an electronic signal were duplicated from a card and the signal resent through the electronic information carrying system, security can still be provided to the system by comparing previous signals off of the same card to the newest signal. Because of speed variations (which are corrected in the translation of the signal within the system), any recent signals (e.g., the last two, two out of the last three, four or five signals, etc.) Which are identical with respect to speed variations along the reading path would be flagged as identical and therefore probably prerecorded rather than newly initiated signals and the transaction refused. Reading devices could be designed with intended speed variations for each different reading of the card information to impose a difference in speed amongst each reading. For example, a chatter, stutter, eccentricity, disuniformity, or random pattern of speed control can be imposed upon the reading equipment (the card or item moving equipment) to assure that each reading will vary in speed. This would assure that where two signal were in fact identical, there is an extremely high degree of certainty that the signal received was electronically generated from a stored signal and was not presently initiated from a reading of a transactional item.

DETAILED DESCRIPTION OF THE INVENTION

Figure 1:
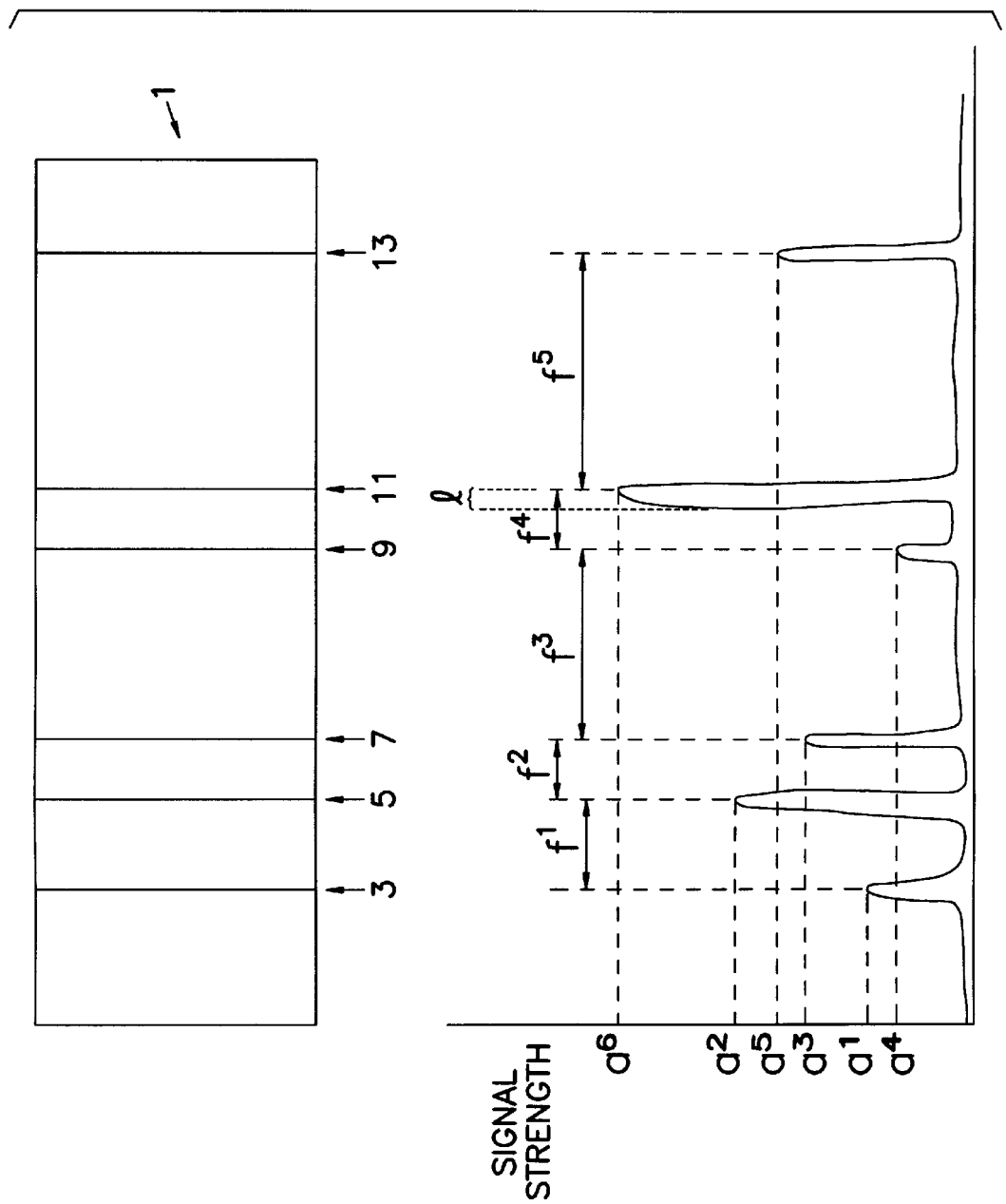
FIG. 1 shows a label for a marketable item or a transactional item 1 with a graph of its read signals in dropped register to elements (3, 5, 7, 9, 11 and 13) in the transactional item 1.

There are three areas in which credit card information is sued in fraud. The first area is forgery of credit cards, in which a plastic blank credit card is manufactured, and a coding of magnetic ink is printed on the card. This card can then be used in personal charging transactions at consumer locations. A second area of consumer card fraud is where the number of a card has been obtained, and a phone order is made using that credit card number. The third area of fraud is where theft of the card has occurred and that card is used in direct consumer charge transactions. There is little technology which can prevent the third area of fraud, except for personal identification on the card, such as a photographic identification or fingerprint, voice print, or other data directly unique to a single user. These technologies are within the grasp of the manufacturers, but they offer difficulties in manufacture and marketing, since greater individual time and effort would be needed in the provision of each credit card for each client.

The present invention provides a mechanism for improving the security of the item without necessarily altering the reading equipment presently used in reading magnetic materials. In addition to a fundamental change in the security encoding envisioned by the practice of the present invention, the latitude and tolerances of the system may be tightened, allowing for enhanced security and greater detail and precision in the information forming the basis of the security encoding, even when the automated or manually driven equipment is imprecisely executed or operating. This will be the first aspect of the present invention described herein.

In any machine read information, where the information is distributed over and area, and usually in a line, some sort of scanning of the area or the line must be performed. This requires that there be some relative movement between the information stored on the item and the reading apparatus (the relative movement may be more virtual, as in the movement of a focal point or reflection if the system is optically read). For example, with a magnetic strip of information on a credit card or bank card, the card may be secured in place and a magnetic reading head moved over the surface of the card, or the reading head is stationary and the card is moved relative to the reading head. One significant problem in such information reading is the fact that if the encoded information contains any frequency components (e.g., spacing between individual signals), the relative speed of the movement between the reading system and the magnetic information becomes important. If the speed varies, the signal will vary, and if the signal varies significantly, approval of the read information may be denied. To prevent improper denial of security because of machine speed operation variations, the latitude of acceptance and/or the tolerance of the system for variations in speed (and hence signal identity) has had to be increased. This weakens the security effectiveness of the system.

One aspect of the present invention provides a means for normalizing data read from an information reading device, the normalization being done to remove variations in data which are caused by variations in relative speed between the data source and the reading source. The basic premise of the invention is as follows:

1) a security reading system is provided on a medium or item which is read by relative movement between a reading device and the security information embedded in the item as a first type of information, 2) at least a portion of the information which is read during said relative movement is dependent upon the relative speed of said relative movement, 3) providing a second type of information on said item which is capable of being read at the same time as the first type of information is being read (by the same or different reading mechanism), said second type of information having a known relationship between pieces, segments, bits, or points of information within said second type of information, 4) reading said second type of information at the same time that said first type of information is being read to generate data from said second type of information, 5) comparing the data from said second type of information with the known relationship within said second type of information to provide an indication of the relative speed and/or relative position of the medium or item (and/or portions of the second type of information thereon) at any given time during relative movement of said item, medium, first type of information, and/or second type of information, and 6) using said indication of the relative speed and/or relative position to normalize data taken from relative movement between a reading device and the security information embedded in the item as a first type of information.

The ease and benefits of this system can be readily seen in this description and in the following exemplifications of the practice of the present invention. The simplest configuration of the present invention would be as follows. A first type of magnetic information comprising the security information is located along a path (linear, circular, sinusoidal, or any other predetermined shape, but preferably a straight-line) which would be traversed by the relative motion of a reading head. Within this same path would be a second region of magnetic information which can generate a signal which could be readily differentiated from the security information signal. This ready differentiation could be done by having the security signal limited to intensities below a specific value (e.g., a cut-off value) and the positioning information limited to intensities above that specific value. The magnetic reading would therefore produce two readily differentiated signals by reading as one signal all data point below the cut-off value and reading a second signal as all values above the cut-off value. By spacing the positioning information at known intervals (repeating identical intervals is preferred and the simplest, but any pattern, either repeating or non-repeating, as long as it is clearly identified), the speed of the relative movement between the magnetic reading head and the item can be readily calculated at any position along the path of relative movement. This is readily accomplished because the spacing between the segments, pieces, bits, elements or other aspects of information are a fixed and known quantity or pattern, and the signal read from the second type of information provides data of frequency and time. As the frequency is the time between (individual) signals, and the physical spacing between the individual signals is a known quantity, the time of moving the distance between individual signals (the speed) can be calculated at least between each point of information. Since the actual speed of the relative movement of the item during reading of the second type of information can be directly calculated, the actual speed during reading of the second type of information, which is the actual speed during contemporaneous reading of the first type of information can also be directly calculated. This direct calculation of the speed can be used to point-by-point, or by interpolation, in analog fashion, convert all data relating to the first type of information to a data stream which corrects for variations in relative speed. This correction greatly improves the accuracy of the information and improves the quality of the tolerances allowed in the system for providing tighter, less reproducible codes. The normalized data generated by this correction can then be compared to a normal speed (the speed of relative movement at which a specific signal would be generated by a reading of the first type of information), and the normal data compared to the expected data at the normal speed. In this manner, variations in speed of relative movement can be compensated for within reducing the specificity and detail of the coded data.

The system of the present invention is also described for use with telephone charges on credit cards or network (via computer) charges using credit cards. A significant amount of credit card fraud occurs when numbers are sent or written (e.g., over the telephone, over computer network systems, or even in writing, without the actual use of the credit card itself). It is important to be able to confirm the authenticity of a credit card in this type of transaction as well as in the personal use of cards within a consumer environment. In this sytem of the present invention, a scanning device similar to that used in the other aspects of the present invention for direct consumer interaction is attached to the computer or telephone to generate a signal authenticating the credit card during the charging procedure or transaction. This signal can be directly entered by the reader into the telephone information transfer or into the computer data for transfer. This system adds additional security to the charging procedure and can help to eliminate fraud where credit card numbers are verbally transmitted over the telephone by requiring the use of the card in an inexpensive reading machine during the charge procedure.

Because of the nature of the data being electronic when it is transferred to the receiving party, it is possible to intercept a signal, record it and use that captured signal in an on-line transmission of the signal. The practice of the present invention with the speed variant correction in the translation/reading of the signal can be used to reduce the likelihood of a captured signal being used successfully, at least reeucing the likelihood that it can be used more than once. Even if an electronic signal were captured or duplicated from a card and the signal resent through the electronic information carrying system, security can still be provided to the system by comparing previous signals off of the same card to the newest signal. Because of inherent speed variations (which are corrected in the translation of the signal within the system) naturally caused by variations in hand speed, hand angles, machine differences, machine wear, etc., any recent signals (e.g., the last two, two out of the last three, four or five signals, etc.) which are identical with respect to speed variations along the reading path would be flagged as identical and therefore indicate that they were probably prerecorded rather than newly initiated signals and the transaction could be refused. Reading devices could be designed with intended speed variations for each different reading of the card information to impose a difference in speed amongst each reading. For example, a chatter, stutter, eccentricity, disuniformity, or random pattern of speed control can be imposed upon the reading equipment (the card or item moving equipment) to assure that each reading will vary in speed. This would assure that where two signal were in fact identical, there is an extremely high degree of certainty that the signal received was electronically generated from a stored signal and was not presently initiated from a reading of a transactional item.

Variations in the speed of the reading of the card can be imposed on the equipment itself so that natural variations which may be caused by different hand speeds, hand angles, machine differences and machine wear can be enhanced or assured. For example, where the card is supported on a flat slide surface, bumps can be added to the slide surface to cause irregularities. Even though the irregularities would remain constant, the variations would increase because of the increase in difficulty in moving in the linear path over the variations. Where a series of rollers are used to support the transactional item during its movement (either its movement along an edge or along a major surface, i.e., a surface defined by its length and width and not just its length and thickness or width and thickness as done in an edge reading), the rollers could be made eccentric in their cross-section so that they would not rotate precisely in a circle. Where there are a number of rollers, with a number of them being eccentric in their rotational shape or axle support, a variation in speed, which would not be readily reproducible or repeatable because of the statistical variation in the relative position of the rollers could be provided. These types of systems would be particularly beneficial with hand or manually accessed card reading systems.

Mechanical, automated systems of reading have always attempted to achieve uniformity of speed movement through the system. It would be desirable in the practice of the present system, where cards are read by insertion into a a mechanical automated reading system which fixes the card and moves a reading head or moves the card past a fixed reading head (or moves both the card and the reading head) to impose a variability to the speed of relative movement of the card (transactional item) and the reading head. The signal would be sent to a central bank of information, as it is presently done, however there would be an extra series of steps performed to ensure authenticity. The last signal would be compared to at least one previous signal, e.g., the next-to-last signal with respect to the actual signal read. The signals would be compared, and because of the different speeds which would be expected (or effected by the imposed variants in the equipment), the signal would not be expected to be identical. If the last signal and the signal or signals ([written as signal(s)] to which the last signal is compared are identical, that would be a clear indication of the likelihood if not the absolute fact that the last signal was electronically generated and was a captured signal. Upon a comparison indicating the likelihood of a captured signal being used in the transaction, an alert could be imposed upon the transaction which would cause the transaction to be terminated, additional information to be sent, a repeat of the scanning information to be sent, or some other special response to the indication of the questionable signal.

Another aspect of the present invention is uniquely suitable for use with the speed correcting controls on the reading of information from a card. The information for the speed correction or any additional information may be readable by optical, electronic, magnetic, or any other means, but at least two signals must be read by the relative movement of a reading device/reading head with respect to the presence of information on the item itself. This aspect will even further enhance the security of the item to a point where even if the card is stolen, a level of security can be provided which is higher than previously achievable. The first source of information may comprise voice data from an individual which can be used to identify a specific individual in a voice recognition analysis. The second signal similarly may be used to modify the first source of information, with a third source of information comprising a voice of a person which is transmitted for comparison to the first source of information after it is modified, and the voice data from the third source of information is compared to the modified first source of information. Upon comparing the voice data from the third source of information to the modified first source of information, access to further data transmission may be allowed or denied. The further data transmission to which access is allowed or denied may be electronic transmission of data.

The process for this enhanced security includes the process for accurately reading information from an item as described above and hereinbelow.

The process requires that there is relative movement between a mechanically readable first source of information on said item and a mechanical reading device, the process comprising:

a) causing relative movement between a first source of information and a device which can read said first source of information to create a first data stream, b) reading said first source of information with said device which can read said first source of information to cause a first data stream, c) at the same time that said first source of information is read, reading from said item a second source of information with a reading device which moves relative to said source of said second information on said item to create a second data stream, said second source of information having a known pattern of information, d) determining from said reading of said second source of information the speed of relative movement of said at each point along a path which said relative movement between said second source of information moves while it is being read, e) using the speed of relative movement of said at each point along a path which said relative movement between said second source of information moves while it is being read to correct variations in said first data stream caused by variations in speed with respect to said relative movement between said first source of information and said first reading device.

This process is particularly unique and effective for security when the first data stream comprises a data stream which identifies a particular voice speaking particular words. The first data stream may then be used for voice identification for security by comparing the data of a particular voice speaking particular words to provide specific identification of a user authorized to communicate with or otherwise use (e.g., complete a financial transaction) from said item. The first stream of data, when corrected from variations in speed in reading the card by the speed correction aspects of the present invention, provides a source of data against which a later emitted voice of a person may be used for identification purposes over the telephone or through any other voice driven electronic transmission of data, such as where the voice signal is electronic transmission of data from a personal computer. The process is more likely to occur where the electronic transmission of data is data transmitted from the operation of a telephone, i.e., direct voice communication.

The system could operate as follows. A caller expecting to perform a commercial or other financial transaction would call (by computer or telephone or other electronic device) a receiving station. The item (e.g., the credit card or smart card) would be passed through a reading machine, with at least one and preferably at least two sources of information generated over the line. The instance of a single source of information would occur when the receiving station has on file the voice pattern and words represented in the voice pattern, and so the speed adjustments can be effected based upon the voice recognition signal. In general, however, there will be at least two signals (and usually three signals as follows. The at least two signals would be the speed recognition pattern and the voice recognition pattern. The speed recognition pattern would be used to establish a basis for correcting the voice recognition pattern on the card for each time that the card or other transactional item is used. When the corrected voice pattern is provided by the correction, the card user would have to speak the required pattern of words (e.g., into a telephone receiver or into a voice receptor hooked up to a computer for voice data transmission). The spoken pattern of words would then be compared to the corrected voice pattern (or if the words were on file, with the file copy of the voice pattern). Based upon a predetermined degree of correspondence between the file voice pattern or the corrected voice pattern and the spoken words, further communication regarding the transaction or access to the line would be allowed or disallowed. As noted, the various signals read from the item may be in any format which can be read by relative movement of the card and a reading device, but magnetic signals, because of their state of the art and commercial availability are generally preferred. As other information storage patterns and formats become available, such as optical, floptical, holographic, etc., these other formats of information may be used, as long as there is relative movement between the reading device and the source of information.

Many variations within this system may also be practiced, as for example, by having two speed measuring strips on opposite sides (opposite edges) of a card or item. The angularity of the magnetic elements may be read in two passes of the card through the reading head. This is done because the card may be read on the opposite edges, the speed corrected, and a precise reading of the same series of magnetic elements at two different locations (the two edges) can be provided. From this data the angularity of the respective strips can be read. The magnetic elements may have zero, one, two or more of the elements parallel or perpendicular to the edges, with any variation from zero to all of the elements perpendicular to the opposed edges or not perpendicular to the edges.

Multiple reading heads may be provided into the system, with one or all of the reading heads operating at the same time or in sequence. For example, there may be multiple reading strips printed onto the card or item, as information or as speed correcting data. The reading heads may operate to read one or more of the strips as the card moves through the reading device. The various strips may be read together, one at a time, partially in sequence, or in any other programmed combination which is desired to enhance the security of the system.

Figure 5:
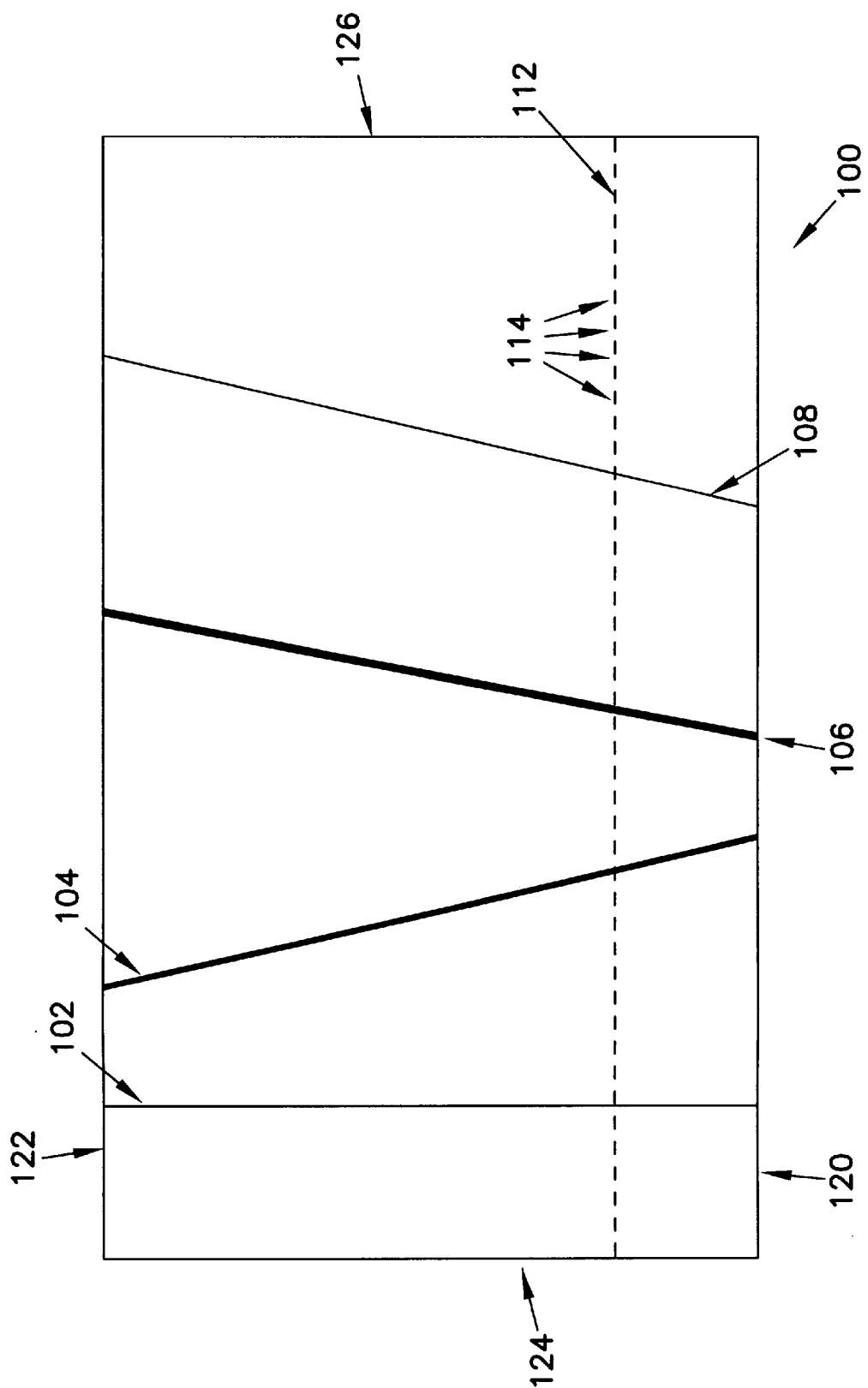
FIG. 5 shows a transactional item 21 with a magnetically readable strip 65 overlaying a magnetically readable position data line 69 with gradationally spaced magnetic data points 71 along the line 69 and coincident along said line 69 are security distributions of randomly distributed magnetic fibers 67.

A magnetically readable item 100 is shown in FIG. 5. This item contains magnetic elements 102, 104, 106, 108 running from a first edge 120 to a second edge 122. Each of the elements 102, 104, 106, 108 contain a magnetically readable (but not necessarily recordable) magnetic material as the filament, as a coating on the filament, or as an embedded or otherwise carried material in or on said filament, fiber, strip, or other elongated element. These filaments, in a less preferred embodiment, need ??? run the entire width from edge 120 to edge 122, but may be more randomly distributed or embedded in a particular pattern within the item.

When the element is magnetically read by a reading head (not shown) which moves in a direction from edge 124 to edge 126, the various forms of information such as spacing between filaments, individual filament intensity, persistence (signal width), and (with two readings spaced apart between edges 120 and 122 or with two magnetic reading heads) the angularity of filaments are read. Some of these signals are dependent upon the speed of the relative movement of the reading head as it passes over or between the filaments (persistence, interval [frequency] and angularity). It would therefore be an idealized apparatus which moved at a single, invariant and constant speed relative to the card or item and the magnetic element information therein. Such perfection is not achievable without great economic costs in the construction of the reading equipment, and the need for uniformity in the speed would eliminate the possibility of cards being moved by hand through a reading track or slot as is most commonly done in commercial outlets. Building in a latitude or softness to the precision of the signals to overlook speed variations would reduce the overall security of the system.

One aspect of the present invention relates to a construction and process in the system which allow for speed variations in the relative movement between a magnetic reader and the information on the item which is to be read during the relative movement. This aspect of the present invention is performed by a process whereby, in addition to the direct security information provided by the magnetic elements 102, 104, 106 and 108, at least a second source of readable information (mechanically readable as by magnetic readers, bar code scanning, optical reading, interference reading, or any other mechanically readable format), which source of information is capable of providing information of the relative speed between the item and the magnetic reading head. This between the item and the magnetic reading head. This information does not necessarily have to be direct information as to read time speed or speed at various positions along the path of movement from edge 124 to edge 126. The simplest method of providing and reading this information is to provide a line of information 112 which is read from edge 124 to edge 126, with the general alignment of the line of information 112 located in a distribution included within a line parallel to or identical to the path of relative movement of the magnetic reading read and the magnetic elements with the security information encoded therein. The simplest element for this purpose would be a pattern or element with evenly and uniformly spaced readable signals of identical intensity along a straight line 112 from edge 124 to edge 126. The information, for example, may be in the form of uniform elements or data 114 which lies along the line 112. When the distribution of information, or more importantly, at any position or change in position relative to the magnetic reading element and security information, can readily be determined by calculation, usually by direct conversion software hardware or chip in the system. As the spacing between these position readable elements 114 is known and the time between signals (and hence between these position readable elements) is read, the speed (fixed distance/variable time) can be used to calculate the actual speed of the item relative to a fixed or relative portion. With this calculation or determination in hand, the speed of the item of any time or any point when the security information is being read can be determined. The actual signal read on the security elements can then be converted to data consistent with a particular speed at the time of the reading of the information.

The broadest aspect of the present invention relating to the correction of motions defects or inconsistency in the reading of information on an item would comprise an article containing a first readable signal on an item, which signal is read by the relative movement of the item and a mechanical reading instrument (e.g., magnetic, optical, electronic, bar coding, laser responsive, reflective, etc.). At least a second readable signal is implanted in the article which has a predetermined and measurable code or frequency in the second signal. The second signal is located within the item so that the second signal is read at the same time as the first signal is read, with the movement of the item being along a path during reading of the first signal which allows a reading of the second signal so that the relative speed of movement of the item and the second information reading device can be determined in direct correlation to the time at which the first signal is read. The second information base is preferably magnetically read information, but may be based upon the other alternative technologies to provide what is referred to herein as the "positioning" information or the "relative speed" information. The first and second reading device may be the same device, different devices, and different types of devices. For example, with a bar code read device or other visually inspected device, a separate strip of magnetic information could be provided and read as the positioning information by a separate magnetic reader. Two separate areas of magnetic information could be provided on an item, with the information to be read by separate magnetic reading heads. An effective and preferred construction in the practice of the present invention would include an item having at least two overlaid information contents which could be distinguished by a single reading by a single magnetic reading head. For example, underneath a conventional printed strip of ink could be the distribution of random magnetic fibers according to the present invention. The identification information of the item (e.g., a credit card) could also function as the positional information, since all data points in the identification information are known. The two types of information could be distinguishable within the entire content of information being read by the single pass by a magnetic reading head. For example, all of the information from the informational bank of signals could have a coercivity below a fixed value, and all of the security information could have a coercivity above that certain value. Similarly, the two different types of data could be separated by a demarcation between persistence (duration) of signals, and even relative frequencies between signals, and/or combinations of these. The data would be 'filtered' to separate the two data streams, and each filtered flow would be used for its unique purpose. If it were not desired to use the information stream of information as the positioning stream of information, a third type of information which could be filtered into its own unique stream of data could also be provided. The three streams of data could be filtered by gateways or fences in the data stream according to known filtering techniques. The same filtering base (e.g., coercivity) could be used to distinguish the three (or more) streams, or combinations or variations amongst coercivity, duration, amplitude, frequency, and angularity could be used. Two separate reading apparatus operating at the same time would simplify the ability to separate the data without compromising the quality of the performance of the system.

Elongated magnetic elements or patterns are provided which are inserted into labels for items or into the items themselves. These elongated magnetic elements may be distributions of fibers, filaments, long or intertwined fibers or threads, strips, coextruded directional dispersions of elongate magnetic materials in a binder or the like. When security elements in the form of pre-made films are inserted into or onto articles, the magnetic elements may be patterns of magnetic materials embedded in or on the film. Preferably the elements are randomly distributed or specifically oriented fibers, filaments, coextruded matrices of film forming binder and magnetic particles or very narrow strips (e.g., thin tapes), as these can provide the highest degree of security, as will be shown later. It is not necessary that the magnetic elements are recordable in the conventional magnetic media sense (as in VHS tape, audio tape, floppy disks, and the like), and it is preferred that the fibers or filaments be magnetic without intent or capability of detailed information recordation during operation of the security system. This would mean that each separate magnetic element would have a single and specific magnetic output if the element were read at substantially any point along its length.

The magnetic elements of the present invention must be clearly distinguished from areas or patterns of continuous magnetic particles in binders which are the object of magnetic materials where recording of information is desired. Magnetic media, such as tape, strips, discs and the like, seek to provide a continuous region of magnetic material, usually in the form of discrete particles of magnetic materials dispersed in a binder. The object is to essentially create an apparent continuous coating of magnetic particles so that the maximum amount of discrete information may be carried by the particles. The ideal situation for such media would be to have infinitesimally small particles bound by infinitesimally thin regions of binder so that infinite bits of information could be recorded and read in the particles. These particles usually (when discrete particles of fairly uniform dimensions such as spheres, cubes, tetrahedrons, etc.) have maximum dimensions of less than 5 microns, usually even smaller. Some magnetic media have attempted to use filamentary magnetic materials, and the longest dimensions of these are generally less then 20 micrometers, more preferably less than 15 micrometers, and most preferably less then 10 micrometers. In addition, these magnetic materials, whether filamentary type materials or more conventional particulate materials attempt to fill as much surface area as possible to provide the densest information reading. As such, much more than 80% of the projected area of a surface must be covered by magnetic materials whether particulates or other forms in magnetic recording media which seeks quality recording information. In contrast, the magnetic elements of the present invention may be used where (for example in a linear read path) less than 80% of the area or dimension (in a linear mode) crossed by the reading head contains magnetic elements. For example, it is reasonable that less than 75%, less then 70%, less than 65%, less than 60%, less than 55%, less than 50%, less than 45%, less than 40%, less than 35%, less than 30%, less than 25%, less than 20%, less than 20%, less than 17.5%, less than 15%, less than 12.5%, less than 10%, less than 9%, less than 8%, less than 7%, less than 6%, less than 5%, less than 4%, less than 3%, less than 2.5%, less than 2.0%, less than 1.5%, less than 1.25%, less than 1.0%, less than 0.9%, less than 0.8%, less than 0.7%, less than 0.6%, less than 0.5%, less than 0.4%, less than 0.3%, less than 0.2%, less than 0.1% of the area contain magnetic elements along the read path, as long as the read path contains preferably at least 3 magnetic elements or three portions of a single magnetic element (e.g., a coiled continuous fiber) which can provide signals across the read path. This may be as little as 0.001% of the area (of the percent of the linear dimension along the line) along the read path (in either linear dimensions or surface area) which could contain magnetic elements. This lower limit may be used as a minimum in a range to each of the values listed above to establish the range amount of area or linear portion which might contain magnetic elements according to the present invention (e.g., 0.001% to 0.1% up to 0.001% to 80% surface area or linear content).

Where fibers or filaments coated or embedded with magnetic particles are the magnetic elements of the invention, the percentages for the area should reflect the dimensions of the fibers or filaments and not just the particles or coating thickness on the fibers/filaments.

The simplest conceived construction within the present invention is a label or film strip which may be secured to a transactional item, label or article of commerce, or even magnetic elements such as fibers or filaments woven or otherwise embedded into the article. The label or film strip has at least two magnetic elements attached to the item, each magnetic element having at least one magnetically readable characteristic or spacing with respect to another magnetic element, such as magnetic strength which can be mechanically read as different from the magnetic strength of another magnetic element, signal duration, magnetic orientation, and the like. There are basically two related, but slightly different formats for providing the readable distribution of magnetic elements in the present invention. In the first format, the magnetic elements are preferably elongate (even continuous) and straight (as opposed to curved, sinusoidal and segmented) and provide a similar or consistent signal along the length of the element (e.g., the same field alignment, the same field amplitude, etc. along the entire length of the magnetic element). In the second format, the magnetic elements (e.g., fibers, strips, filaments, embedded volumes of magnetic particles) are randomly distributed in the item, label or even within a magnetic strip (e.g., magnetic fibers embedded in the printed stripe binder matrix). The pass of the magnetic reader over the randomly distributed fibers generates a signal unique to each item. As the amount and number of fibers may be controlled, even in the random distribution, an excessive amount of information need not be generated. Because the size and strength of the fibers can be significantly greater than that of individual particles in the strip matrix, the strength and stability of the signal can substantially higher. The first format is capable of providing a single signal which is used to encode individual items of great volume, while the second format can be used to individually authenticate individual items of a lesser number, where information storage is not a problem. For example, the first format would be more applicable to the authentication of currency (with a single signal for all like denominations, but a high information content on each item). The second format would be more appropriate for a credit card, specifically for a local chain of stores with a few hundred thousand customers. Both systems and formats could be used for both types of markets with obvious compromises.

With the randomly distributed magnetic elements, it is desirable that the length of the elements are sufficiently long that they can be read easily and consistently with a conventional magnetic reading head, and to this end it may be preferred than the length of the magnetic elements be at least 1%, preferably at least 2%, and more preferably at least 5% of the width of the reading path of a magnetic reading head used in combination with the security item.

The security system is designed so that when the security items move relative to a reading head, as where a label moves through the price reading bar coded device in a controlled direction or the head is moved over the fixed card (e.g., as where a hand held scanner is placed over the label, or a reading head moves within the hand held device) a series of signals is produced, the signals being an encoded signal or other type of specifically predetermined ordering of data points from the elements. It is desirable that the process be performed with a particular end forward and a particular face pointing up, but this is not essential, depending upon the scope of the encoded information. The magnetic elements are aligned in the items to be read (e.g., the transactional item, label or film strip or item of commerce) so that they will enter the reading area of the reading device in a particular ordering. This is, for example, most easily done by having the individual elements extend in a continuous line from side-to-side in the item along the shortest dimension on the face of the item, approximately perpendicular to or angled (other than perpendicular or parallel) with the longest dimension of the item. As the item is moved relative to the reading head, the reading area will detect or create a portion of a complete signal when each readable (magnetic) element passes through the reading area. In an easily constructed mode (and therefore the least secure mode), two magnetic elements may be so aligned within the label (or other security item) so that an at least bimodal (with two elements) signal is read by passage of the magnetic elements through the read area, or two signal points are read which are spaced apart at a predetermined dimension so that the frequency (period) determined by the reading of the two signals (the distance between the elements divided by the speed of movement of the item the security of which is to be enhanced through the reading device) must also match the required frequency (period) for approval or authentication of the item.

One type of such system may be described as a label or security enhancing item having one encircling edge or, for example, two sets of parallel edges comprising a first edge set and a second edge set, the label or item having at least three magnetic elements attached to the item, at least one of said at least three magnetic elements having a magnetic strength (e.g., field intensity) which can be mechanically read as different from the magnetic strength of another magnetic element, at least two of said at least three magnetic elements extending from one edge of an edge set towards the other edge of said edge set (or between the encircling edges) with spacing between said at least two magnetic elements, said spacing defining a period (and when evenly spaced a frequency) when said magnetic elements are mechanically read while moving in a direction at a known or determinable rate, the direction being approximated as that defined by a line between edges in said second edge set which line is perpendicular to said edges in said second edge set, and said at least one of said three magnetic elements defining a first amplitude (either signal amplitude or read amplitude, preferably the latter) when said magnetic elements are mechanically read while moving in a direction approximating that defined by said line between edges in said second edge set, which first amplitude is different from an amplitude of another of said at least three magnetic elements when said magnetic elements are mechanically read while moving in a direction approximating that defined by said line between edges in said second edge set.

The invention also describes a method of authenticating an article, said article having therein at least three magnetic elements having a length which is greater in size than at least one other dimension of width and thickness, said method comprising
  a) moving a magnetic reading head along a path so that said magnetic reading head senses said at least three magnetic elements as said reading head moves along said path, the sensing of said at least three magnetic elements generating a first signal,
  b) comparing said first signal to a predetermined second signal to evaluate a degree of correspondence between said first signal and said second signal,
  c) indicating whether said degree of correspondence is within a predetermined amount of correspondence to authenticate said article.

This method of authenticating an article may also be used where said article comprises at least four magnetic elements having at least one dimension which is at least three times greater than any other dimension of said magnetic element, said method comprising
  a) magnetically reading said magnetic elements in said article by moving magnetic reading head along a line which allows said reading head to pick up signals from said at least four magnetic elements to generate a first signal,
  b) comparing said first signal to a second signal which has been predetermined to authenticate a specific article or one of a series of articles,
  c) determining if a level of correspondence between said first and second signal is sufficient to allow identification of said article.

This method envisions said at least four magnetic elements comprising a magnetic material selected from the group consisting of fibers, filaments, and particles having at least one dimension of at least 0.10 millimeters, preferably from at least 0.1 mm to continuous filaments (e.g., greater than 100 mm). Fiber/filament lengths may be at least 0.01 mm, at least 0.05 mm, at least 0.10 mm, at least 0.15 mm, at least 0.20 mm, at least 0.50 mm, at least 0.75 mm, at least 1.0 mm, at least 0.2 mm, up to continuous lengths. It is preferred that said at least four magnetic elements comprise fibers or filaments, and preferred where said at least four magnetic elements are randomly distributed fibers or filaments or specifically aligned fibers or filaments, and (where randomly distributed) said second signal is a magnetic signal having been taken of said article to specifically identify said article. Where the magnetic elements are distributed within a magnetic strip which is capable of being magnetically encoded, two overlapping signals may be read. This method has some technical relationship to the method practiced in U.S. Pat. Nos. 5,365,586 and 5,428,683, and the apparatus and encoding reading described therein can be used in the practice of the present invention with greater ease and simplicity then the attempt to read random background noise in a printed strip. By specifically selecting the informational content and size of the magnetic elements to be read in the present invention, the signals may be much more readily differentiated and made more stable. The small particles in the magnetic strip readily move about in the binder and change their magnetic properties over time and when repeatedly read. The magnetic elements of the present invention may be tailored more easily to create distinct and more persistent signals.

The method with printed magnetic strips may be practiced in a number of ways, as where said first signal is determined after said magnetic strip has been encoded. The filaments may also have been aligned within said article in a predetermined pattern, and said second signal identifies a type of article and said second signal was not created specifically by a reading of said first signal. The first signal can comprise a signal content of at least two factors selected from the group consisting of field strength, period and duration. The filaments tend to be longer than fibers and may be at least one or two centimeter long, up to continuous lengths which may be looped within the article.

The format using randomly distributed fibers could be read in a number of ways. The scanning over a specific line (e.g., a line at a constant or approximately constant distance from a particular edge, in the manner than magnetic strips are presently read off credit cards) in the item could produce a signal unique to the individual card. This signal could be stored and compared in a file with the individual identifier on the magnetic strip. The random fiber generated signals (and for that matter the aligned filament or element format) could either be read at a separate time than any other magnetic identifier (e.g., the magnetic strip), may be read in the same pass but at a different interval than the strip, may be read at a different location by a separate reading head (e.g., as in a parallel path reading head), or can be read through the magnetic strip. Just as where the background signal could be read between the magnetically printed signal, the stronger random distribution of fibers could provide a stronger, more readily identifiable and stable imprint. It is also possible to have the two signal strengths of the magnetic strip and the fibers be significantly different, yet both be strong. This would allow for a system where the user identifying magnetic signal is read, with all values above a certain strength excluded, and the authentication signal limited to magnetic signal strengths above the cutoff for the identifier signals.

The reading apparatus is may be a hand held or stationary apparatus which is placed in alignment with the label or item. It is a simple configuration if the label is square and a face plate on the hand held reading apparatus is also square. The label or item can be placed within the frame of the reading device, the device activated so that a reading head moves across the face plate, thereby creating and identifying a signal from the magnetic elements in the label or security device.

Another type of this system as described above would have at least four magnetic elements, at least two of said at least four magnetic elements having a magnetic strength which can be mechanically read as different from the magnetic strength of at least two other of said at least four magnetic elements, at least three of said at least four magnetic elements extending from one edge of an edge set towards the other edge of said edge set (or between portions of a continuous, e.g., encircling, edge) with spacing between said at least three magnetic elements, said spacing defining a period or frequency when said magnetic elements are mechanically read while moving in a direction approximating that defined by a perpendicular line between edges in said second edge set, and each of said at least two of said at least four magnetic elements defining an amplitude when said magnetic elements are mechanically read while moving in a direction approximating that defined by said perpendicular line between edges in said second edge set, and the amplitude of at least one of said at least four magnetic elements is different from an amplitude of at least two other of said at least four magnetic elements when said magnetic elements are mechanically read while moving in a direction approximating that defined by said line between edges in said second edge set. This system could still be further improved upon by having at least one of said magnetic elements with a width measured along a line between an edge set which is at least 5% greater than the width of another magnetic element, said width of said at least one of said magnetic elements defining a signal duration when said magnetic elements are mechanically read while moving in a direction approximating that defined by said line between edges in said second edge set, which signal duration is different from a signal duration measured from at least two of said at least four magnetic elements when said magnetic elements are mechanically read while moving in a direction approximating that defined by said line between edges in said second edge set. This item could be constructed with at least one of said elements having a colorant attached to said at least one of said elements which fluoresces or phosphoresces when irradiated.

The present invention also describes a process for authenticating an item having at least two magnetic elements forming a security enhancing item comprising a) moving said security enhancing item in a first direction relative to at least one magnetic sensing or reading device, b) placing said at least one magnetic sensing device along a path intersected by said security enhancing item moving in said first direction so that each of said at least two magnetic elements passes within readable dimensions of said at least one magnetic sensing device, said reading device being capable of determining the presence of a magnetic material (and preferably being capable of measuring the intensity of a signal from a magnetic element, determining the duration of a signal from a magnetic element [or sensing the duration of a signal with sufficient accuracy so that a microprocessor can measure the duration of the signal]), and measuring the beginning and ending of a signal with a response time that enables determination of signal duration and gaps between signals so that the period, frequency and/or distance between signals can be measured or calculated from the signal, c) reading at least one signal from each of said at least two magnetic elements to provide an identification signal, said one signal having at least some components being selected from the group consisting of period (including frequency), amplitude and duration, and d) comparing said identification signal to a predetermined signal identifying a particular type of security item.

The invention may be practiced on machine parts and the like in many different ways such as assembling the magnetic elements into the machine part or affixing a label onto the machine part. With a bolt or screw, for example, the magnetic elements may be embedded into the trough of the threads. This placement of a single magnetic filament within the continuous thread of a screw or bolt creates a pattern of equal spacing (period), so that the filament should be provided with variations in magnetic properties along its length so that a code is effected upon a pattern of signals read while moving in a path parallel to the axis of the screw or bolt. By providing filaments with specific patterns of magnetic material along its length, the wrapping of such filaments into threads of uniform dimensions will produce a specific code when read, thus authenticating the screw or bolt. This can provide a high level of security for critical manufactured parts such as in aircraft, transportation devices, and medical equipment.

The process may include an illumination source to cause dye or pigment in elements (or elsewhere printed) to fluoresce or phosphoresce, and a reading of the emitted spectra to be compared to data on the encoded emission spectra.

A readable dimension, as used in the description of the present invention, simply means that the reading device has sufficient sensitivity to be able to sense the necessary information desired to be read from the element at the particular distance at which the element is passed in relation to the reading device. As the magnetic strength of the element increases, the readable distance or dimension increases with a given magnetic reading element. As the sensitivity of the magnetic reading device increases, the readable distance likewise increases with respect to an element of a given magnetic strength.

Now that the simplest, and therefore least secure arrangements have been identified, with even this system being better than present systems used on labels or the like to reduce unauthorized duplication or forgery, more detailed and more secure systems may also be described.

As noted, the simplest system may have a single magnetic element or two magnetic elements which provide a single signal or two bits of information, possibly providing a frequency measurement as well. More secure systems within the scope of this invention would provide multiple magnetic elements which may have different spacing (in a predetermined ordering) between each adjacent element (to provide varying periods between signal readings or between signal maximums), different magnetic intensities on each or various elements to provide different amplitude signals (which may be in combination with different frequency or period signals), and the elements may even be angled from side to side across the security enhancing item so that reading heads at opposite sides of the security enhancing item must provide the same signal at different intervals for the item to be approved.

The security enhancing item may be constructed easily with the magnetic elements included therein by conventional manufacturing techniques. Visually observable threads or filaments are presently in, for example, a label, so it should be apparent that modern fabric manufacturers currently practice the methodology necessary to include aligned filaments within substrates. Adhesive tapes are also manufactured with reinforcing filaments therein, and the substitution or addition of the magnetic elements of the invention in such tapes would also be a simple matter for manufacturers. The inclusion of magnetic elements such as filaments into other articles of manufacture can be readily done by feeding magnetic filaments (from which the elements are formed) into the fabric or film making support while the substantive fibers are woven or the film is coated or extruded. This will place the filaments within the fabric or film matrix, which will then tighten or solidify around the elements. As noted previously, where a film is used to apply the pattern of magnetic elements, the magnetic particles may be coextruded with the film, embedding the pattern of magnetic material and binder in which they are dispersed into the film. This may tend to limit the pattern to parallel stripes, but is still an improvement over existing security systems. The use of shorter fibers or filaments fed loosely into the extrusion process may be used to form the more random patterns which are highly useful for identifying or authenticating individual products.

Similarly, fibers, filaments or elongated magnetic elements which form the elements may be placed within a mold into which plastic is injected or extruded to solidify into an insert or structural element, identity card or the like. Where the final commercial item is to be formed by lamination, it is a simple task to place the magnetic elements, such as the fibers, filaments or elongated elements forming the elements between the layers to be laminated, then securing the elements into place by bonding, adhering (with or without additional adhesive materials between the layers) or fusing the layers in the laminate. Extruded layers or columns of adhesive carrying magnetic particles of the magnetic elements may be deposited between the layers before lamination or coextruded into on of the lamina. Generally when filaments are used, sufficient tension should be maintained on the filaments when they are placed into position so that they will retain the accuracy of their position during finishing of the label or security enhancing item and remain in the preferred straight position. This is most easily achieved with lamination techniques where tension may be maintained on both ends of the filaments during the lamination process and then trimmed after the process. The elements may also be prepared in advance in sheets or strips which can be more readily inserted into the final element. For example, large area sheets (continuing a sufficient amount of area to provide material for twenty or more security items) may be constructed with the magnetic elements or filaments coextruded with the sheet formation. The large area sheet may then be converted, cut into the appropriate size insert with the elements appropriately located within each of the cut portions, and the cut portions then interlaid between the faces of the component parts of the label, card, article or other item to be secured around the insert.

The method of attachment of the individual strips to the final article of commerce can be important. Where a label is used, the label can be stitched or adhesively attached to the article. There are benefits and disadvantages to either method. Stitching of the label is inexpensive, but the labels can be readily removed and recycled, which provides a means for creating an illegal market in authentic tags. Normal pressure sensitive adhesives can also be stripped from the label or the clothing, but are very easily applied. Thermal adhesives can be less readily stripped, but the less expensive and less durable magnetic materials may be adversely affected by the heat of lamination. The preferred adhesive system is the use of curable adhesives which further polymerize after the layers are contacted. This further cure may be activated by intermediate and transient exposure to radiation which initiates active curing components, light thermal treatment, or humidity. Active polymerizing agents may also be added to the composition which is immediately applied to the label and the label applied to the garment. The most preferred embodiment is as follows. Filaments or patterns of magnetic materials may be dispersed or placed within a water soluble film material (e.g., polyvinyl alcohol, polyvinyl pyrrolidone, pectin films (e.g., amylopectin) and the like. The adhesive may be placed on the back of the film, the film applied to the label or garment, and the adhesive of any type secured to the garment. The advantage of this system is that the authenticating device may be destroyed at the time of sale simply by wiping and dissolving the carrier film for the magnetic materials. This offers some unique anti-shoplifting advantages to the present system and will be discussed in better detail below.

It is also important that the security measures can not be readily reused when put into commerce. This can be prevented only by having the magnetic reading destroyed or sufficiently altered at the point of sale so that it can not be recycled. The present invention offers at least three different mechanisms for removing the authenticating system from the final article in manners which will not allow them to be removed. The first method is to have the magnetic element in a layer which can be treated with a liquid which will not damage the underlying article readily, but will sufficiently alter the distribution of magnetic materials in the security patch or label. The simplest method is to have the magnetic materials in a water-dispersible or water soluble polymer (e.g., polyvinyl alcohol, polyvinylpyrrolidone, water dispersible acrylics, natural polymers and resins such as gelatin, gums, pectins and the like). A series of hard rubs with a water moist pad (or other solvent if desired such as aqueous alkaline solutions, alcohols, etc.) will readily disrupt the critical pattern of magnetic material and prevent it from being used as a security device after sale and wiping of the film. The second type of system would be where the binder for the magnetic particles and elements (or the insert or security item itself) may also be a decomposable binder, particularly one that becomes soluble when irradiated such as phenol-formaldehyde resins containing positive-acting photoinitiators such as diaryl iodonium salts and naphthoquinone diazides and ethers. These types of binder systems are well known in the printing industry and are commonly available with both resol and novolak phenol-formaldehyde resins. The third type of system utilizes the known property of low to medium coercivity magnetic materials to lose large amounts of their strength upon impact or heat treatment. The impact reduction is particularly desirable with labels in the following manner. A hand held device similar to a staple gun or nail gun, with a support or impact plate and a hammer may be used. The label is inserted between the hammer and the impact plate (the hammer being relatively flat). The hammer is activated, striking the label with the magnetic material therein. The impact force can be sufficiently strong (e.g., >>1000 foot pounds/square inch/second; preferably greater than 10,000 ft pounds/square inch/second; still more preferably greater than 100,000 foot pounds/square inch/second; and even more than 500,000 or 1,000,000 foot pounds/square inch/second) as to greatly reduce the magnetic effects of the particles and elements. By having the hammer and plate flat, large areas of the label can be altered, rendering the security label unusable at a later date. An electrically actuated hammer device would be preferable to one in which the cocking force would have to be provided entirely by hand. This would be similar to the forces provided by an electric stapler.

This erasable feature also lends itself to an important aspect of use in a uniquely critical area of product authentication, in machine or apparatus parts. Forged machine parts are a significant cause of apparatus failure, and even include problems on commercial aircraft. Bolts, screws and rivets for example, have extremely rigid parameters and specifications which can not be determined by visual inspection. Forged machine parts, such as aircraft bolts and rivets, can be made very cheaply, if they do not have to meet the rigid requirements of effective part. It is therefor economically profitable to attempt to market cheap forged parts into the costly aircraft part market, even though this endangers the lives of passengers. The inspection process for authenticating aircraft parts is quite complex and can involve destructive testing of random samples of parts, which may not be effective if parts from authentic sources are mixed with parts from counterfeit sources. The technology of the present invention could be used on machine parts, and especially bolts, rivets and screws in the following manner. A strip or patch of magnetically encoded material according to the present invention may be adhered to the machine part, particularly in a position which is later to be subjected to impact forces (e.g., the head of the rivet or the opposite end of the head which also absorbs shock upon hammering of the rivet). Screws and bolts could have magnetic elements placed underneath the heads where stress occurs on the head when the bolt or screw is tightened. If the magnetically secured authentication article containing the magnetic elements of the invention is located on a surface area which is struck by the hammer or crushed by tightening forces, the authentication code can be destroyed. The location of the authentication element at the ends or surfaces of the bolts, screws and rivets also provides for the ability for specialty reading implements and arrangements. For example, because the bolts are generally of a uniform cross-section, especially round cross-sections, the reading apparatus can be designed to fit over the end of the bolt or under the head of the bolt and the path of the reading head can be designed to conform to particular patterns in the cross-section of the bolt or its head. For example, if the bolt were circular, the read path would most appropriately be a circular read path around the axis of the bolt. This would allow for the information in the authenticating article to be read and aligned with the predetermined signal independent of the starting point of the read path. The process could also be desirably practiced where said at least three magnetic elements comprise a single filament with different properties along its length, said single filament being located in the trough of threads in a machine part having threads therein. The read path would then be parallel to the axis of the machine part and overly the threads. A diagonal read path on the head or cross-section would have the problem of having to be particularly aligned, while the circular read path would pick up the information from one or more reads of the authenticating element, and the signal merely would have to be moved into approximate registry with the predetermined signal to authenticate the article.

Similarly, engine blocks and other machine parts can be authenticated by insertion of the authenticating elements of the present invention into the structure. Where higher temperatures are encountered during use of the machine part, the more stable magnetic materials should be used and/or highly insulating material should surround the magnetic elements to reduce thermal degradation of the magnetic properties of the elements. For example, ceramic fibers, such as those used in the tiles on the space shuttle are highly thermally insulating. These fibers can be made by sol-gel drying of extruded compositions at low to moderate temperatures which would not adversely affect the magnetic properties of the magnetic elements. The magnetic elements could be extruded with the sol-gel compositions so that they become and integral part of the ceramic fiber, they could be twined with the ceramic fibers, they could be blended into fabrics with the ceramic fibers, they could be adhered to the ceramic fibers in non-woven constructions and then adhered to the machine part. The adherence could be effected by solidifying the sol-gel fiber within an insert on the engine part or adhering the authenticating tag or label to the surface with high temperature resistant adhesives. The insulating properties of the ceramic fibers would protect the magnetic elements without interfering with their ability to be read.

This erasable feature provides two unique advantages to the present system. Not only is the security element or label destroyed for reuse, but the same magnetic system may also be used as a security system against shoplifting. Present security systems require demagnetization or removal of tags in the store. The practice of the present invention allows for the authentication code and a separate (or the same) anti-shoplifting code to be erased at the same time. The anti-shoplifting code, as indicated, may the same or different code on the label, and the magnetic code may be provided by the same type of system as the present invention, or by an ink layer, deposited magnetic layer or binder layer which can be demagnetized by the same mechanisms used to demagnetize or alter the authenticating code.

A further advantage of the present system is in the use of code reading chips in the reading device. Individual chips may be provided with multiple codes for different manufacturers, or the device may be provided with multiple slots for use with chips provided by the different manufacturers. Each reading device could therefore read authentication labels for multiple manufactures. The chips could be placed in parallel or series for reading of the authentication indicia.

It is less preferred, but well within the skill of the artisan in practicing this invention, to uniquely vary combination(s) of period, amplitude and duration to allow for individual coding of transactional items. For example, the magnetic filaments may be positioned to provide an encoded or unencoded checksum with the article's identification or source.

It is also possible to provide some degree of visual inspection to the item. This could be done by simply coloring the individual elements. There are, however, even better means available for improving security in addition to the magnetic readout. Elements, in addition to their magnetic content, may also have a second machine-readable or visually-readable content within them. For example, a thin coating may be placed on the element which would not interfere with magnetic readout, and would even protect the element from physical wear, extending the possible use life of the transactional item. This thin coating could contain materials which contained color (dye or pigment) or which materials could alter their color upon treatment. It would of course be preferred if the color change were reversible or temporary. Temporary coloration could be provided, for example, by phosphorescent or fluorescent materials which would emit specific wavelengths of radiation when illuminated or heated. These could be at either or both visual and/or mechanical readable wavelengths and intensities. By combining the magnetic readable signals with mechanically readable electromagnetic spectrum radiation (e.g., color) emitted signals, a very secure antiforgery system could be readily devised.

The effects of different element and content ordering within the market items can be expanded upon as follows. FIG. 1 shows a label or security enhancing item 1 having six magnetic elements (3, 5, 7, 9, 11, and 13) arranged perpendicularly to the longest dimension of the item 1. By providing different strength magnetic materials on each element, six different signals with differing amplitudes (a1, a2, a3, a4, a5, and a6 will be provided. Additionally, there will be 5 different period (or when equally spaced, frequency) signals provided (f1, f2, f3, f4, and f5). These signals are arbitrarily represented in FIG. 1 as to amplitude and period, and can be designed with any number of elements with any variety of variation, which would provide an endless number of codes available to protect transactional items. By varying the thickness of the individual elements (e.g., Element 11), a third signal I determined as the length of the signal (endurance) can be generated. This would require a more refined reading program than the relatively simple program necessary for amplitude and frequency, but this would greatly increase the security of the system, without greatly complicating manufacture of the elements or label items (by merely providing wider elements). These magnetic signals, as indicated above, can be combined with color emission signals to provide additional complexity to the encoding of the transactional items.

The individual elements used in the security systems of the present invention can be manufactured by a number of different means. Filament, fiber or thread can be coated in a vacuum chamber with magnetic material, magnetic particles can be dispersed within dissolved polymeric binder and the filament extruded with sufficient magnetic content in the filament composition, magnetic particles may be electrostatically deposited onto filament and fused thereon, magnetic coatings may be vapor deposited onto the filament, and a fluidized bed of magnetic particles can be used to deposit particles onto the filament (fluidization effected by pulsed magnetic flux, electrical field flux, or other physical means which will fluidize the magnetic particles and bond them to the element support). It is also possible to form strips by conventional coating or extrusion of a support layer (e.g., polyester such as polyethylene terephthalate or polyethylene naphthalate) and then slitting the film into the appropriate size filaments. Where the filaments are extruded, readable color content also may be added directly into the binder. Where the magnetic particles are fused or bonded to the filament (or film) surface, color readable particles may be randomly and proportionately mixed into the magnetic particles. Where film is slit, a separate coating layer of color readable material may be provided onto the substrate before or after application of the magnetic layer. The color readable layer could be between the film base and the magnetic material where the film base and/or the magnetic coating was transparent, allowing transmission of an optical signal through one or preferably both of the layers.

The magnetic materials and particulates preferably used in the practice of the present invention should range from those which magnetize easily but not permanently (e.g., Permalloy™) to those which possess a highly stable magnetism (e.g., certain stable rare earth metals including Neodymium and Samarium, and ferrite magnetic compounds which have an essentially permanent magnetism which is not easily altered by external fields of moderate to weak intensity). Different magnetic materials may be used in the various magnetic elements in the transactional item, with different mechanical reading heads chosen which are capable of responding to or sensing only selected materials. Filaments composed of highly stable magnetic materials as described above may have the permanent magnetic field aligned with respect to the axis of the fiber before or after being incorporated into the item where enhanced security is desired. The alignment of the signal can also be read as an additional security identifier. The magnetic field of the elements should generally be sufficiently strong to be read easily (with some safety factor for decreases in strength over the life expectancy of the item), yet not be so strong as to attract environmental contaminants to the item. The last limit is one of convenience and cleanliness rather than one affecting the functional utility of the system.

When high strength and permanent magnetic materials are used in the magnetic elements, the verification process may be enhanced in its ability to be distinguished from magnetic inks. If the label or security item is passed through a moderate strength magnetic field before the item is read, the traditional inks can be distinguished from the strong and permanent elements. The traditional and commercially available inks will not retain a high level of magnetism whereas the high strength and permanent magnetic elements will neither show a permanent loss of strength nor lose its field alignment.

The reading device must at least be capable of reading the frequency or the amplitude or duration of the signals independently. This is easily accomplished as this capacity is readily available in conventional magnetic reading devices. It is preferred that the reading device be capable of reading at least two or even three of these qualities of the signals. It is even more preferred that the reading device include an optical reading function, such as the illumination/fluorescence measuring system described in U.S. Pat. No. 5,418,855. The combination of these four distinct codable entries (frequency, amplitude, duration and emission) would provide a very high level of security. Upgrades on the code signals would then be provided to each placement of reading device, new series of fashions, and the security of the articles would be further enhanced by regular changes in the code. It is desirable in this system to have articles replaced regularly in normal transactional events. This provides a side benefit of making counterfeiting more difficult, and can trace the flow of specific goods more readily. The combination of the in-place security system and a central location for record analysis or comparison is also within the skill of the artisan. For example, the in-place security authenticating device can be connected through lines to a central processing station. Other aspects of the transaction can be combined with the authentication step through the central processing station.

The security of the system could be further enhanced by having at least some of the magnetic elements lying at an angle other than perpendicular with respect to the edges of the item. If the elements were placed at, for example, an angle of fifteen degrees off perpendicular (75 degrees), and two separate magnetic reading heads were placed evenly at the sides of the transactional item as it was moved through the reading apparatus, the same signal (with respect to intensity and duration) would be generated from each element at each head, but at a different time. By encoding the time separation between the two heads (that is the time lapse or period between when each identical piece of the information is read by each head), an additional level of security can be generated. This level of security can be readily heightened with additional position alterations in the elements. For example, if the elements were angled at various specific angles (e.g., Element 3 at 80 degrees, 5 at 70 degrees, 7 at 90 degrees, 9 at 75 degrees, etc.), the total or combined signals read by each head would have both similar features (e.g., Amplitude) and different features (e.g., period). Therefore, two different encoded signals must be met in the same item at the different heads. The level of complexity in the formation and reading of these signals is actually rather small, but the ability to fraudulently reproduce them by other than highly sophisticated technology is significantly reduced.

Figure 2:
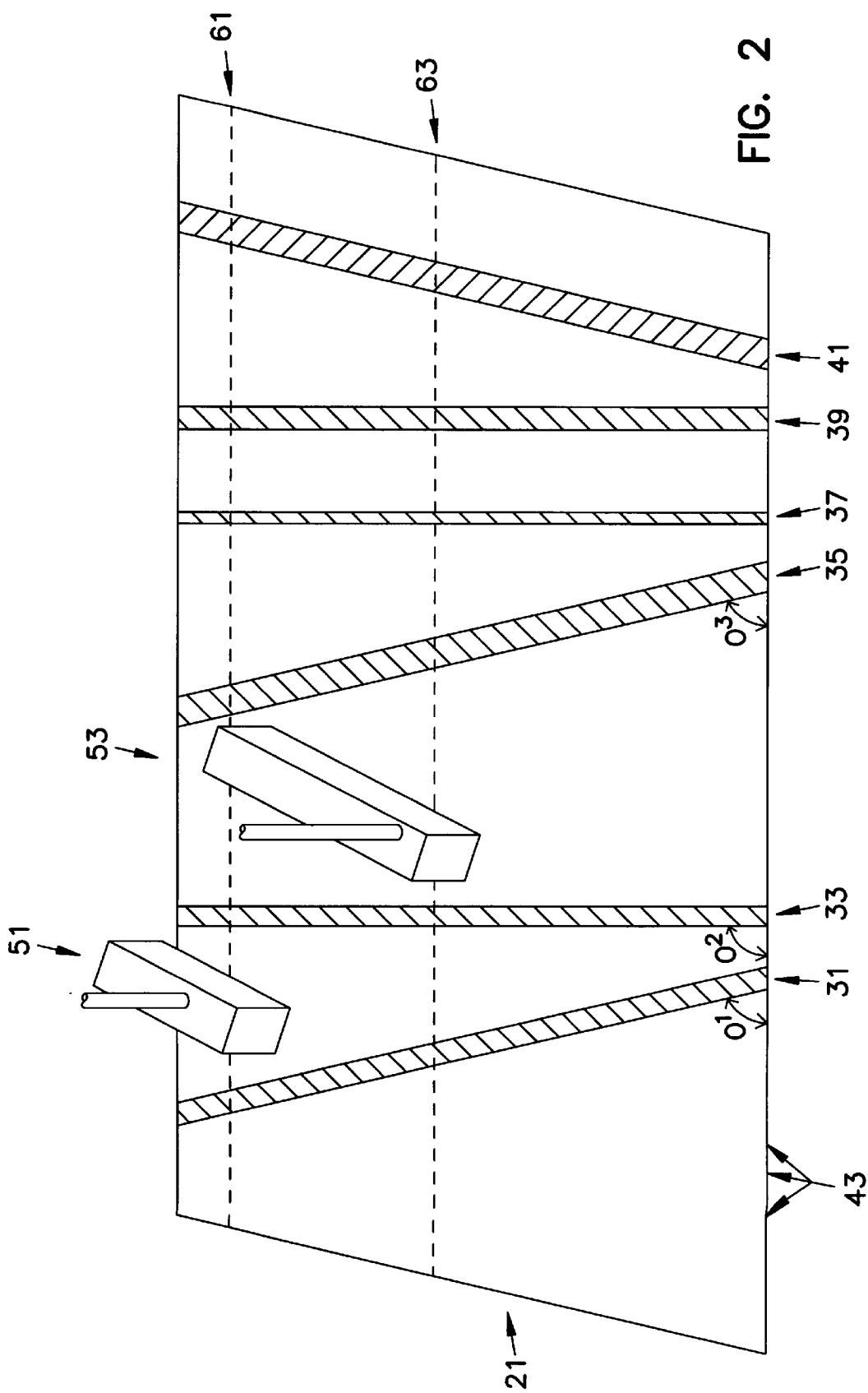
FIG. 2 shows a label 21 for a piece of apparel (not shown) or a transactional item being read by two longitudinally offset magnetic reading heads (51 and 53).
Figure 3:
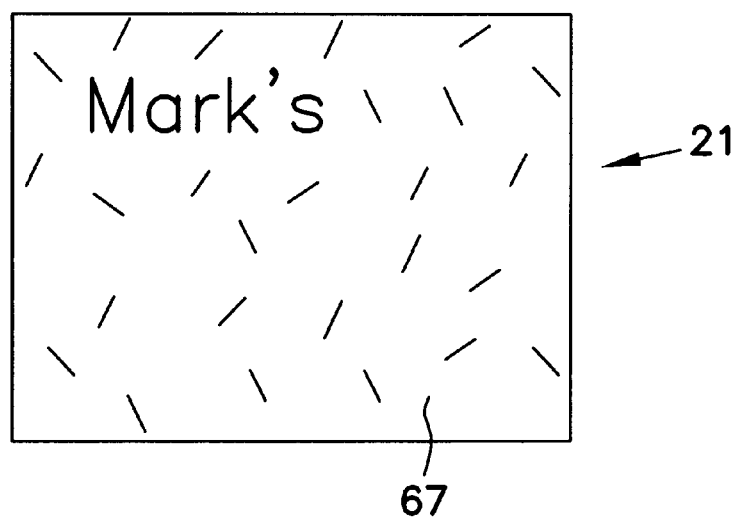
FIG. 3 shows a label or transactional item 21 with randomly distributed magnetic fibers 67 in the label.
Figure 4:
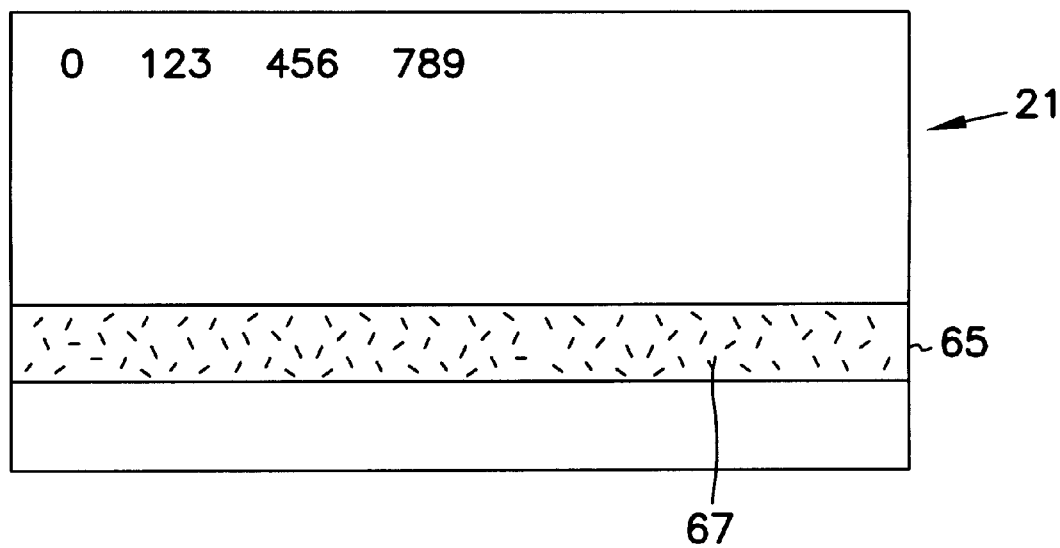
FIG. 4 shows a label or transactional item 21 with a magnetically readable strip 65 with randomly distributed magnetic fibers 67 therein which may be read concurrently with the reading of the magnetic strip 65 or may be read separately in time or space.

FIG. 2 shows an even more complex and therefore less readily counterfeited label or item 21. This item 21 has six readable elements (31, 33, 35, 37,39 and 41). The angle of the individual readable elements (e.g., 31, 33 and 35) with a side edge 43 of the label item 21 may differ from element to element. Element 31 may form angle $O^1$, 33 may form angle $O^2$, and 35 may form angle $O^3$. As a first magnetic reading head 51 is moved along a path 61 on one side of the item 21, a specific signal comprising frequency, amplitude and duration is generated by the passage of the head 51 across the path 61. Because of the different angles formed by the various elements (31, 33, 35, 37, 39, and 41), the frequency read by a second magnetic reading head 63 would be different from the frequency read by the first magnetic reading head 61. The amplitude and the duration read by the two heads (61 and 63) could, however, be the same. They could be different if the width of the individual elements varied and/or the strength of the magnetic coating varied along the length of the elements (although this becomes a less easily controlled level of complexity in manufacturing). A third magnetic reading head (not shown) could also be added at an intermediate position and this would provide a third signal with varying frequency from the first two signals.

Because the coding of the magnetic elements is within the discretion of the manufacturer, the design and alignment of the elements is not strictly limited to arrangements specifically shown in the Figures. Where two reading heads are used, such items which have the elements in the same angle, but not in the same order or position (as would be the result of an element extending across the entire printed sheet before slitting and crossing over other elements), can well be identified by a standard code. If the code reads the ordering of only those perpendicular elements, does not read the frequency or period of angled elements, and compares only the amplitude and duration (and different time between signals at one edge versus another edge on the item, a result of the angling across the item and the different orientation of the reading heads with respect to the leading edge of the item as being scrutinized by the reading device), that element may also have an identifiable code aspect within the authentication system. Both reading heads would identify the amplitude and duration of the same element (as approximately the same), and then the time lag of one part of the element (read by the first head) with respect to a specific other element would be compared with the time lag of another part of the element (read by the second head). A comparison of the different time lags with respect to a specific vertical element within the label or security item would be an indicator of the angle of the angled element. The angle of the element, without respect to its specific location relative to one or more other elements, would then become an additional component of the encoded information.

It is also noteworthy to point out the advantages against forgery this system provides as compared to protection provided by magnetic stripes which are read, as are commonly used with credit cards. It is quite easy to read the signal from a magnetic strip, paint a magnetic stripe on a forged card, and transfer the read information back to the forged card. It would be far more difficult to attempt to read the positioning and strength of filamentary elements in a card, and then place such filaments within a card with the same totality of response characteristics. This is particularly true where the elements are angled and the card is read by two displaced reading heads on opposite sides of the card.

As noted earlier, the essential technology of the present invention may be used for more than just clothing, but may be used with any material upon which a label can be affixed.

Looking at FIG. 1, the figure of a label or security item shown in the Figure can also represent a patch or insert (e.g., from 1×2 mm, up to about 2×5 cm) comprising a plastic film having embedded therein the distribution of magnetic elements described in the practice of the present invention. The patch or insert may be taped, fused or further embedded within the structure of the media. Where used with a desk, for example, the outer edge of the desk may have a small patch of a multifilament patch embedded into an outer edge (or other portion) of the desk. If an improper (attempted forgery) signal is provided, a warning signal or stopping signal is sent through the apparatus. This warning or stopping signal can, of course, direct the apparatus to perform any number of specific tasks. These include alerting an operator that a non-qualified or improperly identified medium has been inserted, cause a second reading attempt to be made or an adjustment in the location of the reading attempt made, and the like.

An example of the best mode of the present system contemplated by the inventor at the time of filing for this invention is:

High strength polyester (polyethyleneterephthalate) filament having a diameter of 0.1 mm is used for all samples unless it is indicated that polyester filaments of 0.2 mm are used.

Magnetic coatings are to be applied to the filaments by conventional vapor deposition or coating of the polyester filaments with a coating solution of particulate (e.g., less than 0.05 mm) magnetic Permalloy™ particles in a dissolved binder which adheres satisfactorily to polyester (e.g., another polyester in solution/dispersion).

Conventional reading heads from audio or video equipment may be modified (particularly in their alignment) to read the items containing the magnetic elements of the constructions of the present invention.

One filament of a pair of 0.1 mm filaments is coated with Permalloy™ by vapor deposition (filament 1) and the other (filament 2) is coated with a lower surface area density of the same magnetic material by solution coating with a 10% solids solution of 5% by weight magnetic particles and 5% by weight polyester binder. The magnetic field generated by the two different filaments will therefore vary by a factor of at least 5 from the higher intensity (vapor deposited) filament to the lower intensity (solution coated) filament. The inclusion of the particles into extrudable plastic materials, and especially into polyurethane compositions, would also be a convenient method of manufacture.

A second pair of filaments having diameters of 0.2 mm are similarly treated by the two different processes so that another pair of different diameter filaments is provided with two different field strengths, filament 3 having the higher field density vapor deposited coating and filament 4 having the lower field density solution coated magnetic coating.

A patch may be prepared by arranging the filaments in the desired orientation such as, reading left-to-right (with the relative angle of the filament with respect to the bottom edge of a film of polyvinyl chloride indicated in parentheses), filament 1 (90), filament 2 (90), filament 3 (75), filament 1 (75), and filament 4 (90). A second film of polyvinyl chloride may be carefully laid over the first layer with the filaments oriented thereon, and the two layers of vinyl resin fused by the application of heat and pressure to laminate the filaments between the sheets of vinyl. This would secure the filaments in a fixed relationship within the vinyl resin. This procedure may be repeated to make as many patches as needed. A segment of the laminate is cut out, leaving the filaments in a predetermined relationship within the laminate. The code is read by a magnetic head and the signal recorded. The signal would identify the ordering, intensity, duration and period amongst and between the filaments. Two offset heads would be necessary to read the angularity data capable of being provided by the angled filaments. Two magnetic reading heads from an audio tape deck may be assembled on a small platen, equidistant from an edge, with conventional signal translating devices still attached to the heads. This portable prototype device could be carried from apparatus to apparatus, if needed. The signal reading portion would be provided with the ability to compare signals (any CPU can accomplish this). The patch from which the signal has been read and recorded would be cut from the laminate and then applied to the outermost edge of a label. The portable reading unit would then be carefully inserted over the label, with the heads located at the reading position of the expected location of the label on the outer edge of the apparel. The CPU device is set up so that when a signal is read, if that signal is properly correlated with the recorded signal, the electrical circuitry identifies an authenticated article. If the signal read from the patch does not match the recorded signal, the CPU is programmed to signal an identification failure and the presence of a probable forged article.

A second method of item preparation is even simpler. Various of the filament samples described above are chopped into fibers of various lengths. The fibers are dispersed into a binder such as polyvinyl butyral and printed as a stripe on a credit card, immediately adjacent to the conventional magnetically read strip. Two reading heads are provided which separately read the magnetic strip and the printed strip of fiber and binder. Each head will produce a distinct signal. The fiber strip, being random and with an information content of essentially unlimited numbers of magnetic points, will fingerprint the printed strip and the item to which it is attached.

What is claimed:

1. A transactional item having at least a first and second magnetic element permanently attached to the item to form a source of magnetically readable information, each magnetic element comprising a fiber, filament or strip, said first magnetic element having at least one magnetic property along the length of said filament or strip or physical spacing from said second magnetic element which can be mechanically read as different from the magnetic property or position of the second magnetic element, said transactional item having at least two edges which are parallel to each other, at least one of said first magnetic element and said second magnetic element being at an angle other than perpendicular with respect to said at least two edges.

2. A transactional item according to claim 1 having two sets of parallel edges comprising a first edge set and a second edge set, said transactional item having at least three magnetic elements attached to the item forming a first source of magnetic information, at least one of said at least three magnetic elements having a magnetic strength which can be mechanically read as different from the magnetic strength of another magnetic element, at least two of said at least three magnetic elements extending from one edge of an edge set towards the other edge of said edge set with spacing between said at least two magnetic elements, said spacing defining a period when said magnetic elements are mechanically read while moving in a direction approximating that defined by a line between edges in said second edge set, and said at least one of said three magnetic elements defining a signal amplitude when said magnetic elements are mechanically read while moving in a direction approximating that defined by a line between edges in said second edge set which is different from an amplitude of another of said at least three magnetic elements when said magnetic elements are mechanically read while moving in a direction approximating that defined by a line between edges in said second edge set, said transactional item having at least two edges which are parallel to each other, said first magnetic element being perpendicular to said at least two edges which are parallel to each other and said second magnetic element being at an angle other than perpendicular with respect to said at least two edges, the difference from perpendicularity in said second magnetic element being mechanically readable.

3. A first apparatus which accepts an article according to claim 1 for use within said first apparatus, said article for use within said apparatus having in at least a portion thereof an item having two sets of parallel edges comprising a first edge set and a second edge set, said first article having at least three magnetic elements attached to the item which form a first source of information, at least one of said at least three magnetic elements having a magnetic strength which can be mechanically read as different from the magnetic strength of another magnetic element, at least two of said at least three magnetic elements extending from one edge of an edge set towards the other edge of said edge set with spacing between said at least two magnetic elements, said spacing defining a period when said magnetic elements are mechanically read while moving in a direction approximating that defined by a line between edges in said second edge set, and said at least one of said three magnetic elements defining a signal amplitude when said magnetic elements are mechanically read while moving in a direction approximating that defined by a line between edges in said second edge set which is different from an amplitude of another of said at least three magnetic elements when said magnetic elements are mechanically read while moving in a direction approximating that defined by a line between edges in said second edge set, said first apparatus having attached thereto a second apparatus capable of reading signals from the elements in said item, said second device having means to send signals read from said item to a means which can compare signals read from said item to at least one predetermined set of signals, comparing said signals read from said item to said predetermined set of signals, causing said primary apparatus to start, continue or alter its operation depending upon said signal read from said item having sufficient correspondence to said predetermined set of signals.

4. A method of authenticating an article, said article comprising an article according to claim 1 having at least four magnetic elements, each of said four magnetic elements having at least one dimension which is at least three times greater than any other dimension of said magnetic element and which form a first source of magnetically readable information, said method comprising a) magnetically reading said magnetic elements in said article by moving magnetic reading head along a line which allows said reading head to pick up signals from said at least four magnetic elements to generate a first signal, b) comparing said first signal to a second signal which has been predetermined to authenticate a specific article or one of a series of articles, c) determining if a level of correspondence between said first and second signal is sufficient to allow authentication of said article.

5. A method according to claim 4 comprising the steps of said item having a second source of information present on said item, said second source of information being disposed in said item so that when said first set of information in said item is read by relative movement of a first reading device, a reading device which has no relative movement with respect to said first reading device may read said second source of information from said item at a relative speed with respect to said second source of information which is identical to the relative speed between said first set of information and the relative movement of said first reading device, said reading of said second source of information providing data which indicates the speed of the item relative to said reading device which has no relative movement with respect to said first reading device during a time period when said second source of information is being moved relative to a reading device which has no relative movement with respect to said first reading device, causing relative movement between said first source of magnetic information to provide a signal from said first reading device, said relative movement also causing contemporaneous relative movement of said second source of information with respect to said reading device which has no relative movement with respect to said first reading device, determining a speed for the relative movement of said second source of information with respect to the said reading device which has no relative movement with respect to said first reading device, and modifying data obtained from reading said first source of magnetic information with respect to its speed at any point while it is being read on the basis of the speed determined for the relative movement of said second source of information with respect to the said reading device which has no relative movement with respect to said first reading device.

6. A transactional item having at least a first and second magnetic element permanently attached to the item forming a first source of magnetic information, each magnetic element comprising a fiber, filament or strip, said first magnetic element having at least one magnetic property along the length of said filament or strip or physical spacing from said second magnetic element which can be mechanically read as different from a magnetic property or position of the second magnetic element, said transactional item having at least two edges which are spaced apart from each other, said first magnetic element extending in a direction from one of said at least two edges towards another of said at least two edges and said second magnetic element being at an angle other than parallel to said first magnetic element.

7. The item of claims 1 or 6 where there are at least four magnetic elements, at least two of said at least four magnetic elements having a magnetic strength which can be mechanically read as different from the magnetic strength of at least two other of said at least four magnetic elements comprising a first magnetic element, a second magnetic element, a third magnetic element, and a fourth magnetic element, at least three of said at least four magnetic elements extending from one edge of an edge set towards the other edge of said edge set with spacing between said at least three magnetic elements, said spacing defining a period when said magnetic elements are mechanically read while moving in a direction approximating that defined by a line between edges in said second edge set, and each of said at least two of said at least four magnetic elements defining a signal amplitude when said magnetic elements are mechanically read while moving in a direction approximating that defined by a line between edges in said second edge set which is different from an amplitude of at least two of said at least four magnetic elements when said magnetic elements are mechanically read while moving in a direction approximating that defined by a line between edges in said second edge set, said transactional item having at least two edges which are parallel to each other, said first magnetic element being perpendicular to said at least two edges which are parallel to each other and said second magnetic element being at an angle other than perpendicular with respect to said at least two edges.

8. The item of claim 6 wherein there is a second source of information present on said item, said second source of information being disposed in said item so that when said first set of information in said item is read by relative movement of a first reading device, a reading device which has no relative movement with respect to said first reading device may read said second source of information from said item at a relative speed with respect to said second source of information which is identical to the relative speed between said first set of information and the relative movement of said first reading device, said reading of said second source of information providing data which indicates the speed of the item relative to said reading device which has no relative movement with respect to said first reading device during a time period when said second source of information is being moved relative to a reading device which has no relative movement with respect to said first reading device.

9. A process for accurately reading information from an item in which there is relative movement between said a mechanically readable first source of information on said item and a mechanical reading device, said process comprising:

a) causing relative movement between said first source of information and a device which can read said first source of information to create a first data stream, b) reading said first source of information with said device which can read said first source of information to cause a first data stream, c) at the same time that said first source of information is read, reading from said item a second source of information with a reading device which moves relative to a source of said second information on said item to create a second data stream, said second source of information having a known pattern of information, d) determining from said reading of said second source of information the speed of relative movement of said at each point along a path which said relative movement between said second source of information moves while it is being read, e) using the speed of relative movement of said at each point along a path which said relative movement between said second source of information moves while it is being read to correct variations in said first data stream caused by variations in speed with respect to said relative movement between said first source of information and said first reading device.

10. The process of claim 9 wherein said first source of information and said second source of information are each magnetic information which can be read by:

a) a single reading device which can differentiate said first and second source of information or b) two separate reading devices, one reading device which reads said first source of information and a second reading device which reads said second source of information.

11. The process of claim 9 wherein said first source of information comprises voice data from an individual which can be used to identify a specific individual in a voice recognition analysis.

12. The process of claim 11 wherein said second signal is used to modify the first source of information, a third source of information comprising a voice of a person is transmitted for comparison to the first source of information after it is modified, and said voice data from said third source of information is compared to said modified first source of information.

13. The process of claim 12 where upon comparing said voice data from said third source of information to said modified first source of information access to further data transmission is allowed or denied.

14. The process of claim 13 wherein said further data transmission to which access is allowed or denied is electronic transmission of data.

15. The process of claim 14 wherein said electronic transmission of data is electronic transmission of data from a personal computer.

16. The process of claim 14 wherein said electronic transmission of data is data transmitted from the operation of a telephone.

17. A transactional item having at least a first and second magnetic element permanently attached to the item to form a source of magnetically readable information which can be read from said item by relative movement of said item past a magnetic reading device, with said relative movement occurring along a path, said first magnetic element having at least one magnetic property
   a) along the path which intersects a filament or strip or
   b) physical spacing among said first and second magnetic element which can be mechanically read as different from a magnetic property or relative position of the second magnetic element, said transactional element having at least two relatively opposed edges,
   said first magnetic element said second magnetic element being at an angle other than parallel with respect to each other,
   said transactional element also having a separate area of mechanically readable information which can be read during relative movement of said item along said path, said separate area of mechanically readable information having a known pattern of information which can be used to determine the instantaneous speed of said relative movement at any time during said relative movement of said item.

18. A system of reading and authenticating a transactional item comprising the transactional item of claim 17 and a reading device which is capable of simultaneously reading
   a) information from said first magnetic element and said second magnetic element, and
   b) said separate area of mechanically readable information which can be read during relative movement of said item along said path.

19. The system of claim 18 wherein said simultaneous reading of a) and b) is performed by the same reading device.

20. The system of claim 18 wherein said simultaneous reading of a) and b) is performed by different reading devices.

21. A method of verifying the authenticity of a source of information comprising the steps of:
   a) providing a first signal from a source of information by moving an item along a path relative to a reading element, said relative movement along said path allowing a signal to be read which identifies the speed of relative movement of said item with respect to said reading element at a period of time during which information is being obtained from said item,
   b) transmitting said signal to a location where prior records or information attributed to previous signals from said item are stored,
   c) comparing said first signal to a defined signal(s) attributed to previous signals from said item,
   d) said comparing evaluating whether said first signal has a level of conformity to said defined signal(s) which excedes a predetermined level of conformity, and
   e) providing a warning signal if the predetermined level of conformity is exceeded.

22. The method of claim 21 wherein said first signal is generated by the relative movement of a credit card or smart card through a magnetic reading device.

23. The method of claim 22 wherein said relative movement is effected by manually holding the credit card or smart card and moving the card by hand through the magnetic reading device.

24. The method of claim 22 wherein said magnetic reading device is structured with components which tend to increase the randomness and non-repeatability of relative movement between the smart card or credit card and the magnetic reading device.

25. The method of claim 24 wherein the components which tend to increase the randomness and non-repeatability of relative movement between the smart card or credit card and the magnetic reading device make reproducibility of movement of a credit card or smart card through the magnetic reading device at a uniform speed more difficult than a similar reading device with uniformly smooth and symmetric components and paths.

26. The method of claim 22 wherein said reading device is structured with components which tend to increase the randomness and non-repeatability of relative movement between the item and the reading device.

27. The method of claim 22 wherein said reading device transmits information through a computer or telephone line to a location where prior records or information attributed to previous signals from said item are stored.

28. A transactional item having at least a first source of mechanically readable information permanently attached to the item to form a source of readable information which can be read from said item by relative movement of said item past a reading device, with said relative movement occurring along a path,
   said transactional element also having a second area of mechanically readable information which can be read during relative movement of said item along said path, said second area of mechanically readable information having a known pattern of information which can be used to determine the instantaneous speed of said relative movement at any time during said relative movement of said item.

29. A system of reading and authenticating a transactional item comprising the transactional item of claim 28 and a reading device which is capable of simultaneously reading
   a) information from said first magnetic element and said second magnetic element, and
   b) said separate area of mechanically readable information which can be read during relative movement of said item along said path.

30. The system of claim 29 wherein said simultaneous reading of a) and b) is performed by the same reading device.

31. The system of claim 29 wherein said simultaneous reading of a) and b) is performed by different reading devices.

32. A transactional item having at least a first, second and third magnetic element permanently attached to the item to form a source of magnetically readable information, each magnetic element comprising a fiber, filament or strip, said first magnetic element having at least one magnetic property along the length of said fiber, filament or strip, or physical spacing between said first magentic element and said second magnetic element which can be mechanically read as different from the magnetic property or position of the second magnetic element, said transactional element having at least two opposed edges, at least one of said first, second or third magnetic element being at an angle between said opposed edges so that said first, second or third magnetic element does not traverse between said opposed edges in the shortest path.

* * * * *